(12) United States Patent
Frost

(10) Patent No.: US 12,267,145 B2
(45) Date of Patent: *Apr. 1, 2025

(54) RECONFIGURABLE WIRELESS RADIO SYSTEM FOR PROVIDING HIGHLY SENSITIVE NATIONWIDE RADAR FUNCTIONALITY USING A LIMITED NUMBER OF FREQUENCIES AND ADAPTABLE HARDWARE

(71) Applicant: Holloway H. Frost, Houston, TX (US)

(72) Inventor: Holloway H. Frost, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,996

(22) Filed: May 18, 2023

(65) Prior Publication Data

US 2023/0291463 A1 Sep. 14, 2023

Related U.S. Application Data

(63) Continuation of application No. 17/305,987, filed on Jul. 19, 2021, now Pat. No. 11,695,468, which is a
(Continued)

(51) Int. Cl.
*H04W 24/02* (2009.01)
*H04B 7/04* (2017.01)
*H04B 7/185* (2006.01)

(52) U.S. Cl.
CPC ........... *H04B 7/18506* (2013.01); *H04B 7/04* (2013.01)

(58) Field of Classification Search
CPC .. G05D 1/104; G05D 1/0088; H04B 7/18504; H04B 7/024; H04B 7/18506;
(Continued)

(56) References Cited

U.S. PATENT DOCUMENTS

| | | | |
|---|---|---|---|
| 6,163,681 A * | 12/2000 | Wright | H04B 7/18506 455/66.1 |
| 8,848,605 B2 | 9/2014 | Ohm et al. | |

(Continued)

*Primary Examiner* — Jung Liu
(74) *Attorney, Agent, or Firm* — McAughan Deaver PLLC

(57) ABSTRACT

A highly sensitive RADAR system comprising a plurality of ground stations, where each ground station includes a plurality of ground-based directional antennae, each ground-based directional antenna having a beam width associated with a particular area of the sky above the ground station and, for each ground-based directional antenna, a least one software defined radio is coupled to the directional antenna in such a manner as to enable the ground-based directional antenna to transmit radio frequency signals generated by the software defined radio at one or more frequencies and to provide to the software defined radio frequency signals received by the ground-based directional antenna at one or more frequencies; and where each of a plurality of the ground stations is configured to transmit a radio frequency signal into a specific defined area of space in such a manner that the various transmitted radio signals will arrive in the defined area of space at substantially the same time; and wherein, each of the plurality of ground stations are further configured to detect reflected radio signals from an object within the defined area of space; and wherein the system further includes a processor for processing any reflected signals received by is the plurality of ground stations to identify the presence of objects within the defined space.

14 Claims, 27 Drawing Sheets

Related U.S. Application Data continuation-in-part of application No. 17/318,030, filed on May 12, 2021, now Pat. No. 11,146,326, which is a continuation of application No. 16/867,636, filed on May 6, 2020, now Pat. No. 11,031,997, which is a continuation of application No. 16/731,780, filed on Dec. 31, 2019, now Pat. No. 10,700,768.

(58) Field of Classification Search
CPC ....... H04W 4/046; H04W 24/02; H04W 4/40; B64C 39/024; B64C 2201/146; B64C 2201/145; B64C 2201/143; B64C 2201/122

See application file for complete search history.

(56) References Cited

U.S. PATENT DOCUMENTS

| | | | |
|---|---|---|---|
| 9,553,657 B2 | 1/2017 | Cordone | |
| 10,812,291 B1* | 10/2020 | Barzegar | H04L 12/46 |
| 2008/0182573 A1* | 7/2008 | Lauer | H04L 49/15 |
| | | | 455/431 |
| 2011/0099371 A1* | 4/2011 | Roy | H04L 63/0823 |
| | | | 713/168 |
| 2013/0281106 A1* | 10/2013 | Lynch | H04B 7/18506 |
| | | | 455/452.1 |
| 2016/0050012 A1* | 2/2016 | Frolov | H04B 7/18504 |
| | | | 455/431 |
| 2016/0119052 A1* | 4/2016 | Frerking | H04W 24/02 |
| | | | 455/431 |
| 2016/0205724 A1* | 7/2016 | Shi | H04W 92/02 |
| | | | 370/254 |
| 2019/0086938 A1* | 3/2019 | Shattil | B64C 39/024 |
| 2022/0128612 A1* | 4/2022 | Dzierwa | G08B 21/18 |

\* cited by examiner

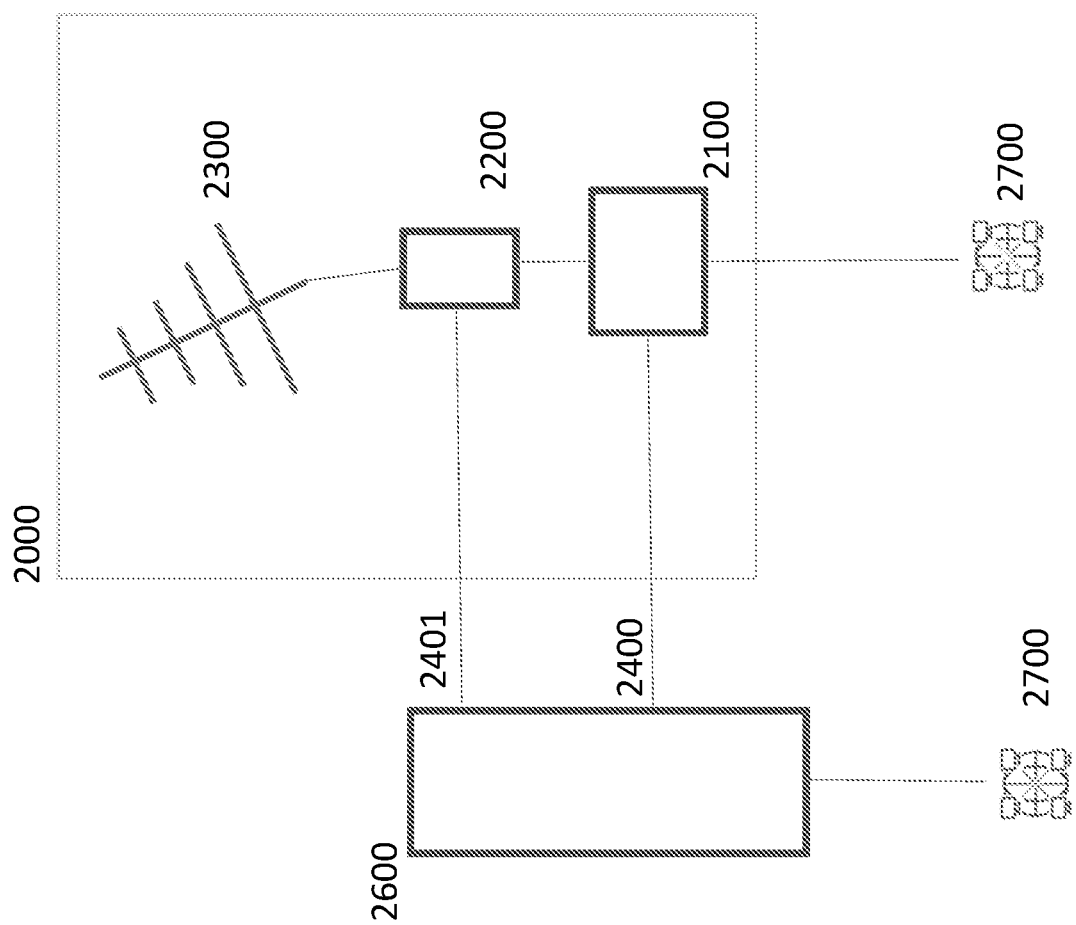

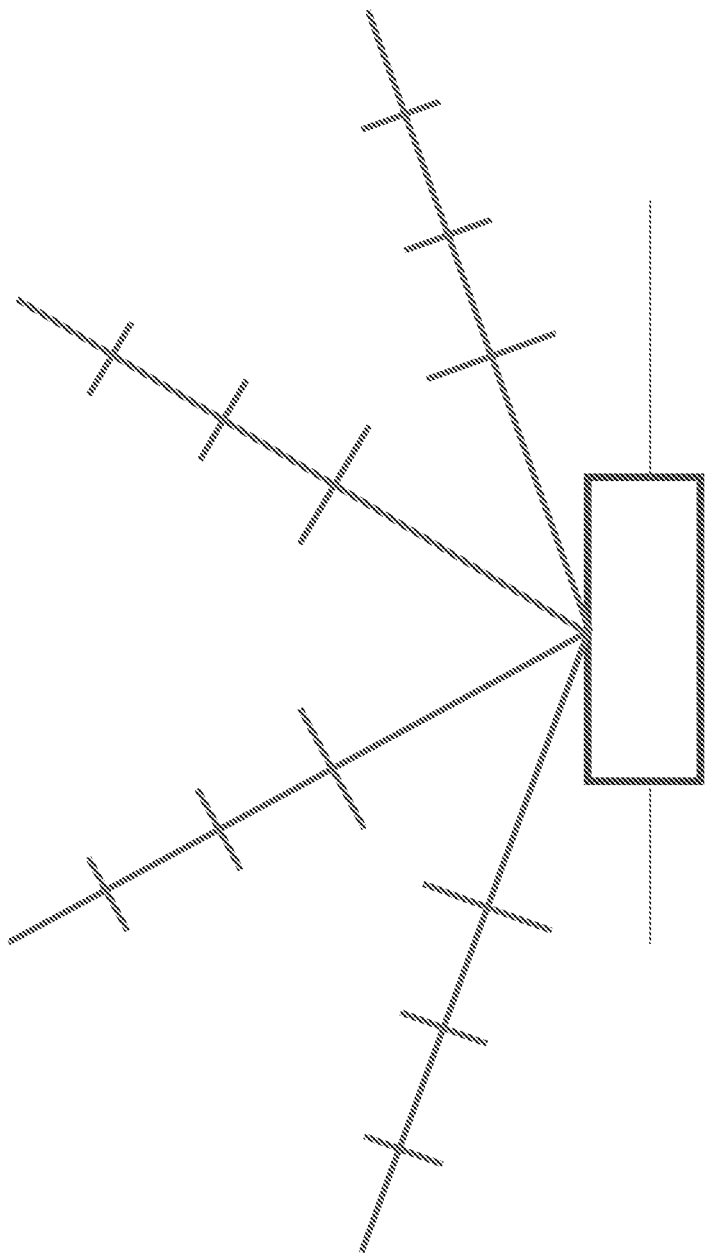
FIG. 4G1

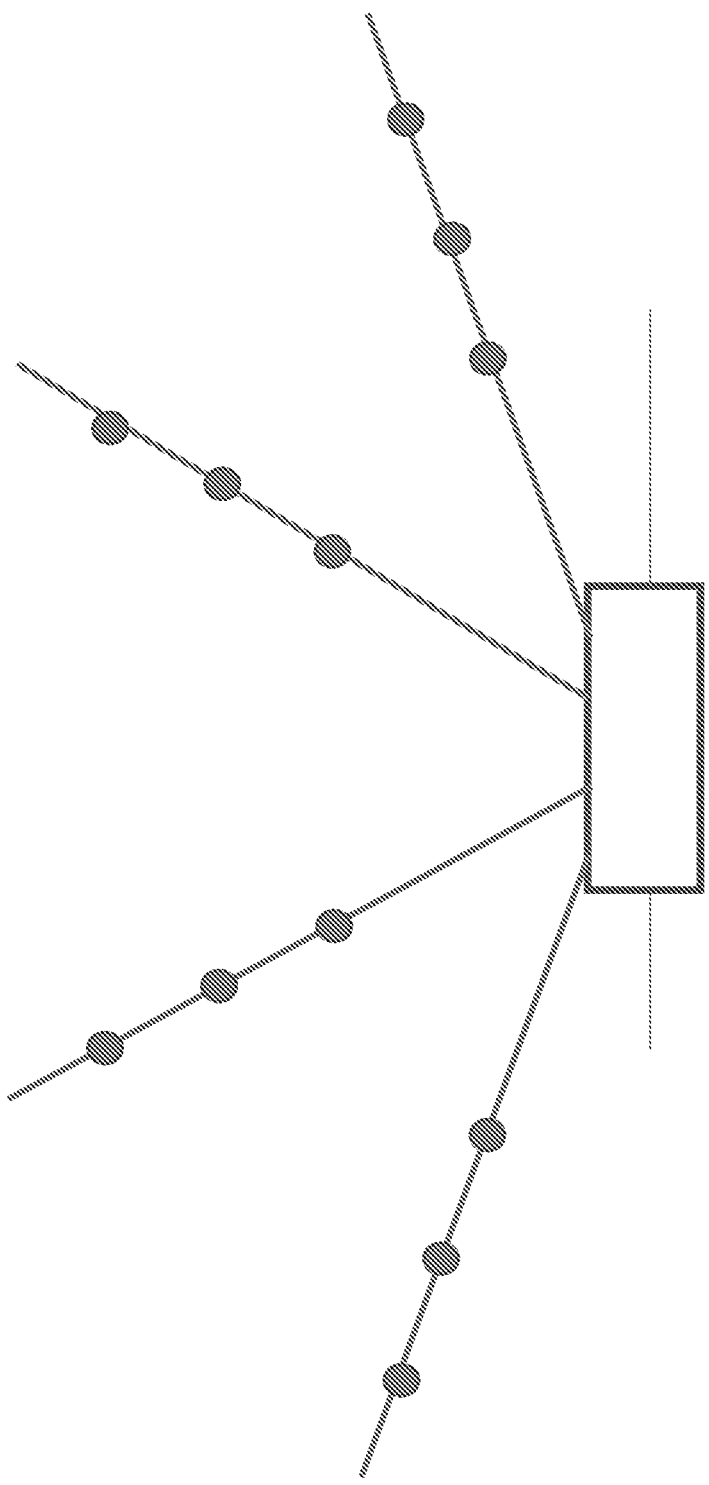
FIG. 4G2

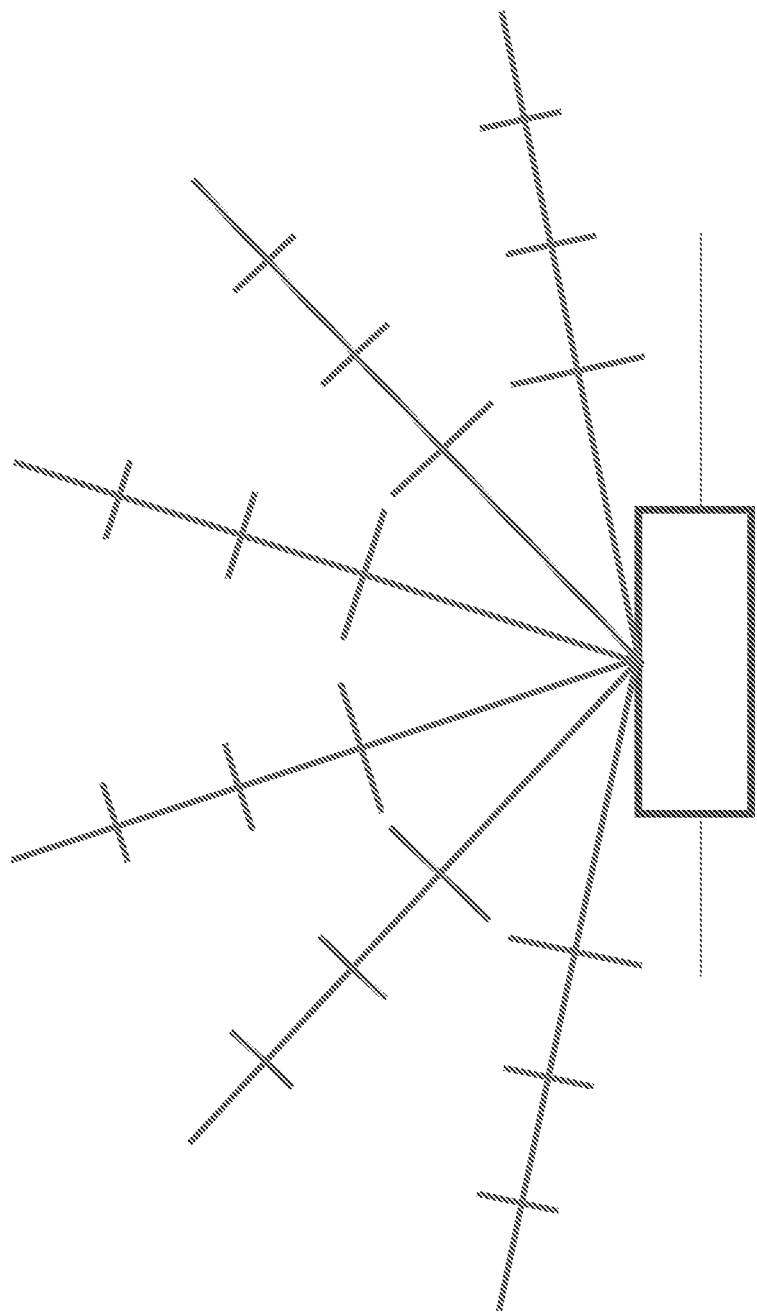
FIG. 4H1

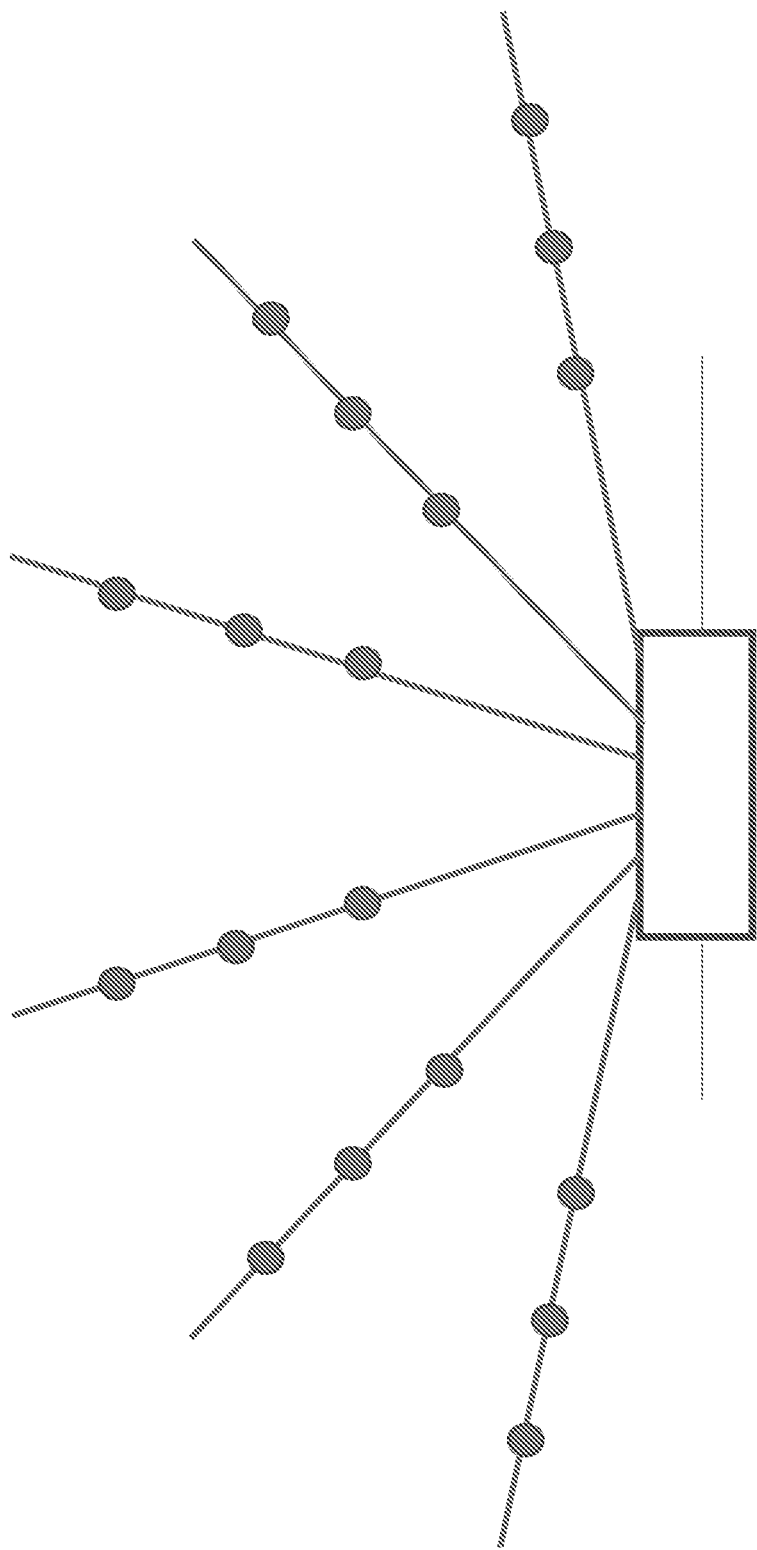
FIG. 4H2

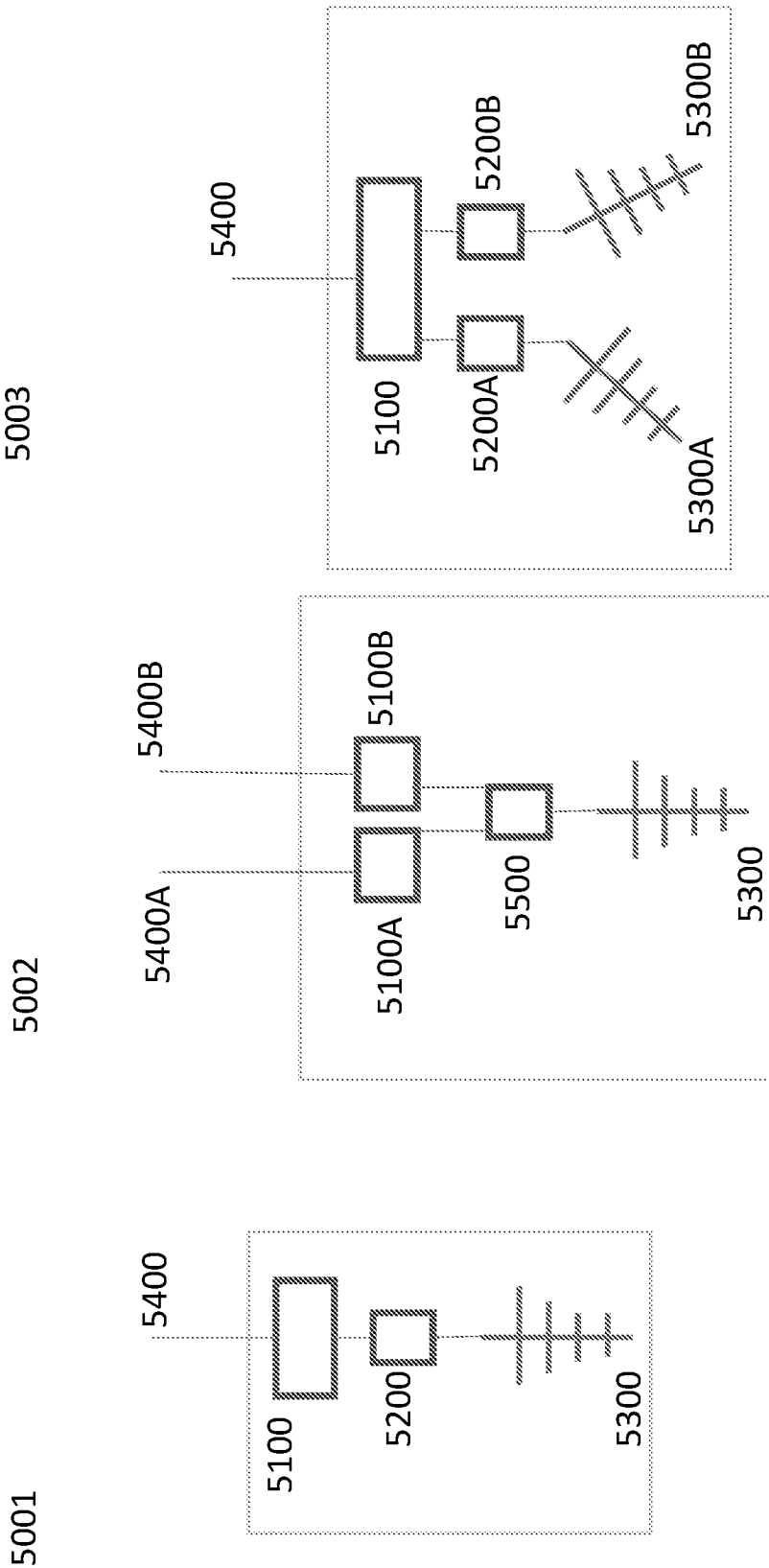

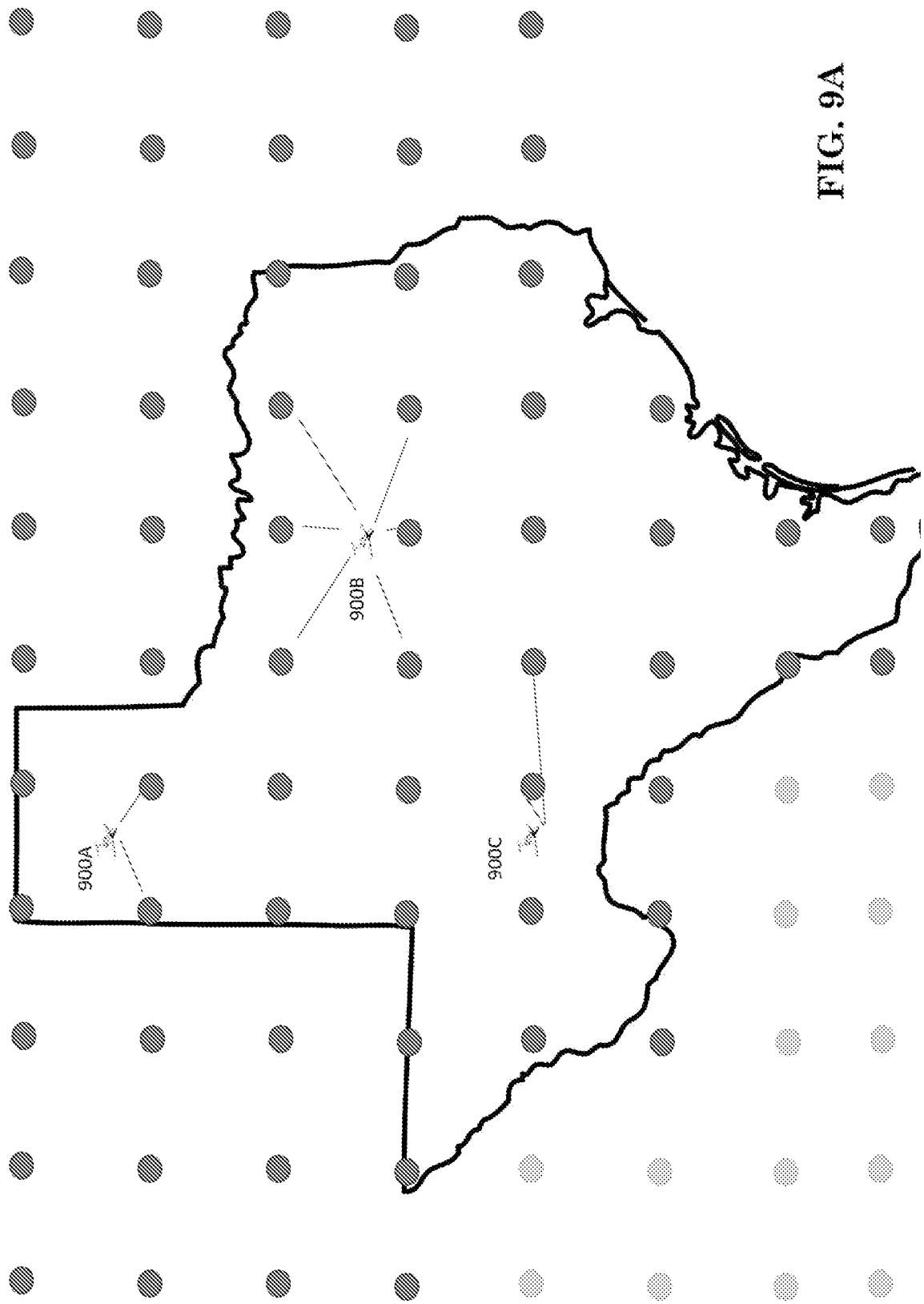

RECONFIGURABLE WIRELESS RADIO SYSTEM FOR PROVIDING HIGHLY SENSITIVE NATIONWIDE RADAR FUNCTIONALITY USING A LIMITED NUMBER OF FREQUENCIES AND ADAPTABLE HARDWARE

CROSS REFERENCE TO RELATED APPLICATIONS

This application is a Continuation-in-Part of U.S. patent application Ser. No. 17/318,030 filed on 2021 May 12, which is a Continuation of U.S. patent application Ser. No. 16/867,636 filed on 2020 May 6, now U.S. Pat. No. 11,031,997, which is a Continuation of U.S. patent application Ser. No. 16/731,780, now U.S. Pat. No. 10,700,768, filed on 2019 Dec. 31. The contents of which are incorporated by reference in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention The inventions disclosed and taught herein relate generally to a reconfigurable system for providing a highly sensitive nationwide RADAR functionality to detect airplanes and other objects traveling through the sky.

DESCRIPTION OF THE RELATED ART

Attempts have been made to provide highly sensitive RADAR systems to detect objects traveling through the sky, such as airplanes. To date, such systems have often required large and costly ground and air systems and have required the utilization of relatively complicated, expensive and burdensome systems. Additionally, such systems are typically unable to detect airborne objects having a relatively low RADAR profile.

The use of such complicated systems and procedures poses several challenges.

The present inventions are directed to providing an enhanced RADAR system for providing detecting objects having an extremely low RADAR profile, such as airplanes and drones employing stealth technology, that avoids and/or overcomes shortcomings of the systems and methods discussed in the materials referenced above (and other existing systems and methods). In one exemplary embodiment, these problems are solved or mitigated through the use of multiple ground stations that can transmit highly-directional signals, and receive and detect signals from specific overhead areas, to detect low RADAR profile objects flying over a geographic region, such as the United States.

BRIEF SUMMARY OF THE DISCLOSURE

A brief non-limiting summary of one of the many possible embodiments of the present disclosure is:

A highly sensitive RADAR system is provided that comprises a plurality of ground stations positioned across a geographic region from which highly directional signals may be transmitted to a defined area of the space above each ground station, where each ground station includes: a is ground station control unit, the ground station control unit including at least one communication port coupled to the Internet; a plurality of ground station radio antenna assemblies, each ground station radio assembly including: a software defined radio, the software defined radio including at least a first communication port enabling communication between the ground station control unit and the software defined radio; a second communication port coupled to the Internet; and an output port; a radio frequency amplifier having a transmit input coupled to receive the output of the software defined radio and a transmission output; and a directional antenna coupled to receive the output of the radio frequency amplifier and transmit the received signal into a defined space above the ground station, each directional amplifier further adapted to receive radio frequency signals received from within the defined space; wherein, the ground station control unit is adapted to configure each software defined radio within the ground station control unit to provide radio frequency signals at a selected frequency and at a selected bandwidth; wherein each of the software defined radios is configured to receive signals from the Internet through its Internet connection and process such signals to generate radio frequency signals corresponding to the received Internet signals at the selected frequency and the selected bandwidth; and wherein each of the software defined radios is configured to further receive antenna signals from the antenna at the selected frequency and the selected bandwidth and process such signals to generate communication signals provided to the Internet; wherein, each of a plurality of the ground stations is configured to transmit a radio frequency signal into a specific defined area of space in such a manner that the various transmitted signals will arrive in the defined area of space at substantially the same time; and wherein, each of the plurality of ground stations are further configured to detect reflected signals from an object within the defined area of space; and wherein the system further includes a processor for processing any reflected signals received by the plurality of ground stations to identify the presence and location of objects within the defined space.

Additionally, or alternatively the system of the present disclosure may take the form of an air-to-ground RADAR system comprising: a plurality of ground stations, each including a plurality of ground-based directional antennae, each ground-based directional antenna having a beam width associated with a particular area of the sky above the ground station; for each ground-based directional antenna, a least one software defined radio coupled to the directional antenna in such a is manner as enable the ground-based directional antenna to transmit radio frequency signals generated by the software defined radio and to provide to the software defined radio frequency signals received by the ground-based directional antenna; wherein, each of a plurality of the ground stations is configured to transmit a frequency signal into a specific defined area of space in such a manner that the various transmitted signals will arrive in the defined area of space at substantially the same time; and wherein, each of the plurality of ground stations are further configured to detect reflected signals from an object within the defined area of space; and wherein the system further includes a processor for processing any reflected signals received by the plurality of ground stations to identify the presence and location of objects within the defined space.

Other potential aspects, variants and examples of the disclosed technology will be apparent from a review of the disclosure contained herein.

None of these brief summaries of the inventions is intended to limit or otherwise affect the scope of the appended claims, and nothing stated in this Brief Summary of the Disclosure is intended as a definition of a claim term or phrase or as a disavowal or disclaimer of claim scope.

DESCRIPTION OF THE VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

FIGS. 2A-2C illustrates various aspects of approaches and examples that may be used to implement the exemplary Ground Stations of FIG. 1.

FIGS. 4A-4I illustrates exemplary arrangements for the directional antennas of exemplary given Ground Stations, with the directional antennas being designed and oriented to received/transmit radio signals from/to a preferred region of the sky.

FIGS. 5A, 5B, 5C illustrate different exemplary forms that the Air Radio/Antenna Assemblies in each Air Station may take.

FIGS. 9A and 9B depict exemplary approaches for distributing Ground Stations across a geographic region over which high bandwidth communications with objects traveling through the sky are desired.

DETAILED DESCRIPTION

Figure 1:
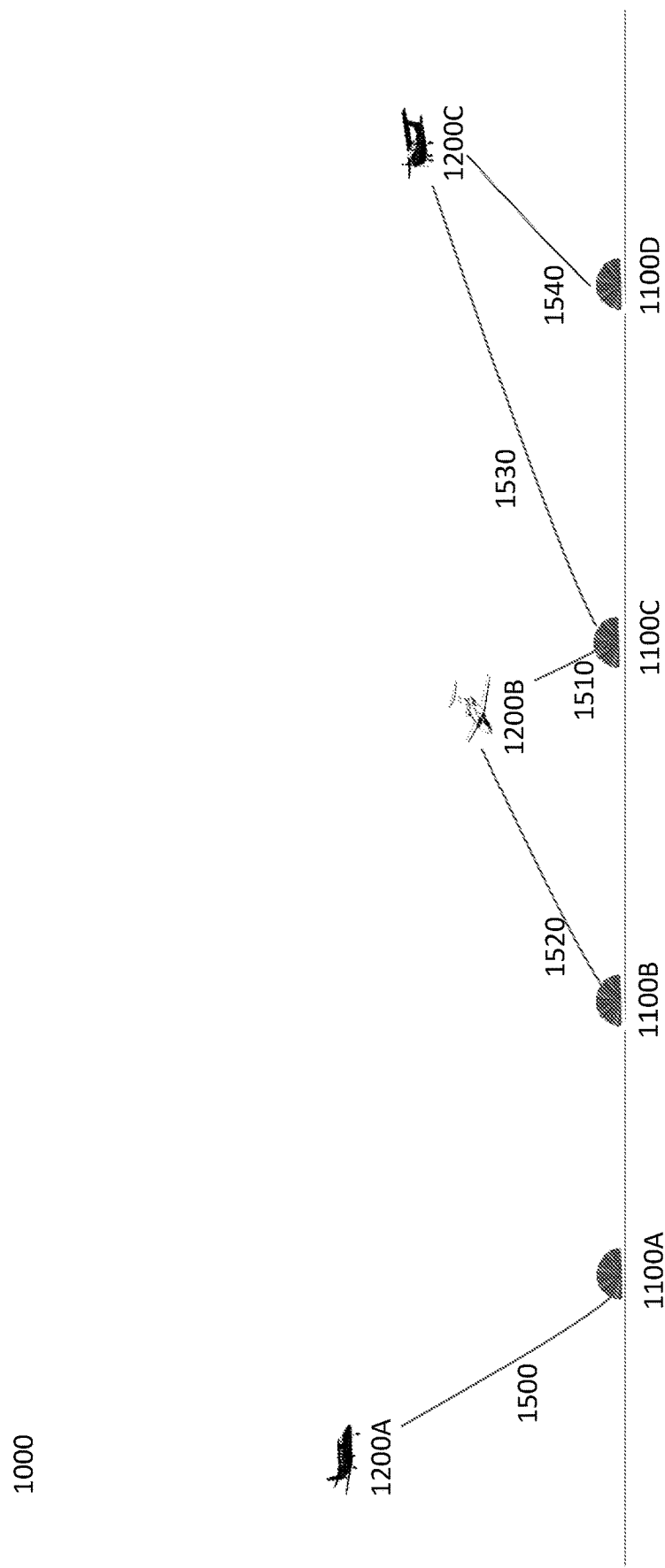
FIG. 1 illustrates an exemplary system 1000 for providing a high bandwidth communication connection, such as an Internet connection to objects traveling through the sky, is such private or commercial airplanes.

SYSTEM OVERVIEW: FIG. 1 illustrates an exemplary system 1000 for providing a high bandwidth communication connection, such as an Internet connection, to devices within an airplane traveling through the sky, such as smart phones, tablets, and laptop computers within the cabin of a private or commercial airplane. Note that the images in FIG. 1 are for representational purposes only and are not to scale.

As described in more detail herein, the system of air stations, with each air station—in one example—being associated with a given air-based object such as an airplane. Each air station is able to communicate with one or more ground stations through the use of directional antennas and programmable radios. In certain examples, each air station is also able to provide a local wireless network within the plane in which it is positioned to support wireless communications, such as Internet communications, with devices within the plane.

In many of the examples described herein, each air station is made up of a number of radio-antenna assembles such that a given air station can communicate with a plurality of different ground stations any given time. In such examples, the bandwidth available to each air station can be significant since the total bandwidth available to the air station will be the collective bandwidth provided by the various ground stations with which it is communicating along with any overhead that the used protocols require.

In some of the examples discussed herein, each ground station will include a number of different radio-antenna assemblies, such that each ground station can communicate with a number is of air stations at any given time.

Having a large number of ground stations alone can provide effective bandwidth between a single airplane and the Internet. However, this will not be effective if there is more than a single airplane associated with each ground station. To provide larger amounts of bandwidth to each airplane, ground stations may be configured with multiple antennas where each antenna may be separately configured to one or more transmission frequencies. This may then allow each ground station to provide Internet access to multiple aircraft. Similarly, aircraft may be provided with multiple antennas where each antenna may be separately configured to one or more transmission frequencies so that each aircraft may then simultaneously connect to multiple ground stations. Combining these enhanced capabilities of ground stations and air stations may provide significant bandwidth to devices on many aircraft at the same time.

Additionally, since many of the examples described herein utilize software defined radios, the characteristics of the communications between each air station and each ground station it is communicating with can be varied to avoid interference, efficiently allocate bandwidth, and ensure optimum operation of the system.

Referring to FIG. 1, the exemplary illustrated system includes a plurality of Ground Stations 1100A-1100D that may be used to support bi-directional high-bandwidth communications with devices the plurality of airplanes 1200A-1200C.

Ground Stations and Ground Station Radio-Antenna Assemblies ("GRAAs"):

As discussed above, in some of the systems described herein, multiple ground stations are provided that can be used to communicate with the air stations in the systems. In general, each ground station will be formed from multiple, individual, antenna-radio assemblies. Each antenna-radio assembly can be used to enable bi-directional communications with a given antenna-radio assembly in an air station.

As discussed in more detail below, each of the Ground Stations 1100 is a reconfigurable system that is capable of supporting a large number of bi-directional communication links with a number of airplanes located with a region of the sky above the Ground Station. In the example, the structures used to establish and maintain the communication links are reconfigurable, such that operational parameters of each communication link can be quickly and dynamically changed. Nonlimiting examples of parameters that can be dynamically changed are the frequency used for communications enabled by the link, the bandwidth of those communications and the power level of the signals used to enable the communication link. Each Ground Station can communicate with many airplanes at once in the sky above the Ground Station and can provide high bandwidth Internet communications to such planes to the extent enabled by the Internet connection to the Ground Station. Similarly, each aircraft may simultaneously communicate with multiple Ground Stations.

While much of the discussion of communication signals in the examples of this disclosure are in the context of providing bandwidth to/from the Internet, it should be understood that the system and approaches disclosed herein are not limited to the provision of Internet communications and that the present disclosure can be used to facilitate high bandwidth communications of most any type including packet switching and circuit switching technologies.

As discussed in more detail below, in certain examples, each Ground Station includes a Ground Station Control Unit coupled a plurality of Ground Station Radio/Antenna Assemblies ("GRAA"). Each GRAA is capable of supporting at least one communication link and, in certain embodiments where each GRAA is able to simultaneously communicate signals having different frequencies, the number of communication links that is equal the number of different frequency signals that can be simultaneously communicated at any given time.

In the example of FIG. 1, each GRAA includes at least one software defined radio ("SDR"), a radio frequency ("RF") amplifier; and a directional antenna with a beam width associated with a particular area of the sky above the Ground Station 1100 that includes the GRAA. In general, each GRAA is capable of transmitting radio frequency signals into the particular area of the sky associated with the directional antenna of that GRAA and is capable of receiving radio frequency signals from that particular area of the sky. The frequencies at which the signals are transmitted and/or received and processed can be dynamically changed through configuration of the SDR within the GRAA. In general, the directional antennas of each of the GRAAs should cover a specific region of the sky above the Ground Station in which the GRAA is contained. In certain embodiments, the overlap between regions covered by different GRAAs within a single Ground Station can be non-existent or limited.

Because each Ground Station will include a number of GRAAs, each Ground Station will include a multitude of antennas pointing at the sky. In certain embodiments, no two of the antennas within a given Ground Station will point to the same area of the sky. Thus, the total bandwidth that will be available from the Ground Station will equal the number of radio-antenna assemblies within the Ground Station multiplied by the bandwidth that can be provided by each radio-antenna assembly. The total bandwidth available from the system will, in turn, by the total bandwidth available from each Ground Station multiplied by the total number of Ground Stations within the system. In another embodiment, it may be beneficial to have two or more antennas pointing to the same section of sky, where each antenna is using frequencies not used by any other antenna.

The number of Ground Stations 1100 shown in FIG. 1 is representative only. The number of Ground Stations in an implemented system will vary and will likely vary based on the size and scope of the geographical region to be serviced by the disclosed system AIR STATIONS AND AIR STATION RADIO-ANTENNA ASSEMBLIES ("ARAAS"): In the specific example of FIG. 1, each of the airplanes 1200 includes an Air Station. As discussed in more detail below, each of the Air Stations is a reconfigurable system that is capable of supporting a large number of bi-directional communication links, where various operational parameters of each communication link can be quickly and dynamically changed. In the embodiment of FIG. 1, each airplane includes a plurality of Air Station Antenna Radio Assemblies ("ARAAs").

Similar to the Ground Stations discussed above, each Air Station includes a number of radio-antenna assemblies. Each of the radio-antenna assemblies in each Air Station is capable of establishing one (or more) communication links with a given Ground Station. Thus, the total maximum bandwidth available to a given Air Station will be the number of radio-antenna assemblies in the Air Station multiplied by the number of communication links supported by each radio-antenna assembly multiplied by the maximum bandwidth available for each communication link.

Similar to the Ground Stations discussed above, each Air Station includes a controller that may be used to control the frequency/frequencies, bandwidth and other parameters of the communication links supported by the Air Station. In the example of FIG. 1, this is accomplished by ensuring that each ARAA includes at least one software defined radio ("SDR"), a radio is frequency ("RF") amplifier; and a directional antenna with a beam width associated with a particular area of the sky below the Air Station. In general, each ARAA is capable of transmitting radio frequency signals into the particular area of the sky associated with the directional antenna of that ARAA and is capable of receiving radio frequency signals from that particular area of the region below it. The frequencies at which the signals are transmitted and/or received and processed can be dynamically changed through configuration of the SDR within the GRAA.

In general, the directional antennas of each of the ARAAs should cover a specific region of the space below the Air Station in which it is contained. In certain embodiments, the overlap between regions covered by different ARAAs within a single Air Station can be non-existent or limited.

Because each Air Station will include a number of ARAAs, each Air Station will include a multitude of antennas pointing to a region of space below the Air Station In certain embodiments, no two of the antennas within a given Air Station will point to the same region of space In one exemplary embodiment, each Air Station on each airplane within the system includes six ARAAs (and thus six antennas and at least six SDRs) such that it can communicate simultaneously with six ground stations. In this example, each radio-antenna assembly win each Air Station would be capable of communicating over ⅙ of the space below the airplane.

In the example of FIG. 1, when an airplane in a section of the sky above a Ground Station, the Ground Station can communicate with the airplane through the use of a GRAA within the Ground Station. The airplane can, in turn, communicate with the Ground Station through the use of an ARAA within the plane. By coordinating the configuration and operation of the Ground Stations and the Air Stations, the system 1000 is capable of establishing one or more high-bandwidth communication links between each of the Air Stations and one or more of the Ground Stations.

In the example of FIG. 1, the high bandwidth link (or links) between each Air Station and one or more Ground Stations can then be used to provide high-bandwidth connections to wireless devices within the given plane. In particular, the bandwidth available to each airplane will be the bandwidth available for each communication link multiplied by the number of communication links supported by the air station.

The bandwidth available to each airplane can be distributed to multiple devices within the airplane. For example, the total bandwidth available to the airplane can be allocated to devices built-into the airplane and to devices used by passengers traveling on the plane. In the example of FIG. 1, this functionality is provided through the provision, within each Air Station, of a wireless distribution device, such as a Wi-Fi router (not illustrated in FIG. 1) that establishes a high bandwidth wireless communication network within, for example, the cabin of the plane. Devices within the plane's cabin can join the Wi-Fi network and communicate using the Wi-Fi network within the cabin of the plane in the same general manner that such devices would communicate with a Wi-Fi device within a land-based location.

The devices in the plane that can access the bandwidth provided by the disclosed system can take many different forms. For purposes of the examples in this disclosure, the devices within the cabin of the plane that can access the Wi-Fi network established within the cabin of the pane by the distribution device can comprise or consist of any electric devices capable of accessing a land-based Wi-Fi network. Such devices include but are not limited to laptop computers; tablet computers; smart phones; smart watches or other communicating wearable devices, or any other device that is capable of communicating across a local wireless network.

In one of many envisioned embodiments, controls may be put in place aboard the plane to segment the devices into groups so that they may make use of the plethora of communications channels available to the Air Station. In an example where an Air Station has established links to two Ground Stations, half of the on-board devices may be directed to one Ground Station and the other half to the other Ground Station. This distribution of access may be handled seamlessly by a controller aboard the plane such that the actual physical path between the plane and the Internet need not be known to any of the devices, but will appear to be seamless. It is envisioned that these groups need not be static, but devices may be moved from one to another, or even into new groups as network usage increases and/or decreases for each on-plane device.

In another envisioned embodiment, all of the traffic from all of the devices may be round-robined from the Air Station to each of the Ground Stations. The ground-based system may then send return traffic to the Air Station from any available Ground Station in a similar round-robin is fashion.

During operation of the exemplary system of FIG. 1, bi-directional communications can be established between each of the Air Stations in one or more of the planes 1200A-1200C and one or more of the Ground Stations 1100A-1100D to provide massive communication bandwidth to the Air Station. For example, to the extent that bandwidth is desired for plane 1200A, and plane 1200A is positioned over a portion of the sky above Ground Station 1100A, a communication link 1500 can be established, over a given frequency range, between the GRAA within Ground Station 1100A associated with the space in which the plane 1200A is located and the ARAA within the Air Station on plane 1200A associated with the space below the plane 1200 in which the Ground Station 1100A is located. As plane 1200A travels through the sky and into a region of space no longer associated with the specific GRAA within Ground Station 1200A involved in the initial communication link, a further communication link can be established between a different the GRAA within Ground Station 1100A that associated with the new space in which the plane 1200A would then be located and the ARAA within the Air Station on plane 1200A associated with the new space below the plane 200 in which the Ground Station 1100A is located.

As noted above, each Ground Station in the disclosed system is responsible for a particular region of the sky over the area supported by the system. Thus, as a given airplane travels across the area supported by the present system, the plane will pass through the region if sky supported by a given Ground Station such that that that Ground Station would no longer be able to communicate with the airplane. In order to maintain the provision of the same bandwidth to the plane, the communication link supported by that Ground Station will need to be transferred to a different Ground Station that is capable of supporting communications for the claim.

For example, as plane 1200A travels through the sky, plane 1200A may pass out of the regions of the sky associated with the various GRAAs within Ground Station 1100A and into a region of the sky associated with one of the GRAAs within Ground Station 1100B. In such an event, a communication link between an appropriate ARAA in the Air Station within plane 1200A and a GRAA within Ground Station 1100B associated with the region of the sky in which the plane 1200A is located can be established. In this manner, communication bandwidth can be provided to plane 1200A at all times.

Because each Air Station in the described example is capable of supporting communications between multiple Air Station radio-antenna assemblies and multiple Ground Stations, the number of communication links between the airplane and the ground can be dynamically controlled to increase or decrease the bandwidth available to the airplane to ensure that the provided bandwidth is aligned with the bandwidth required. For example, in the example discussed above, situations may arise wherein the bandwidth of the communication link established between an Air Station and a single Ground Station is insufficient to support the level of communications desired with the plane. In such a situation, the system exemplary system of FIG. 1 enables establishment of an additional communication link between the Air Station for which additional bandwidth is required and a second Ground Station, such that the Air Station would now be served by two active communication links This situation is exemplified by plane 1200B in FIG. 1.

Referring to plane 1200B of FIG. 1, communication links 1510 and 1520 are illustrated between the Air Station within plane 1200B and Ground Station 1110C and Ground Station 1100B. Although not illustrated, it will be understood that each of such communication links will exist between an ARAA within the Air Station on plane 1100B and a GRAA within one of Ground Station 1100C and a GRAA within Ground Station 1100B. In this example, because two distinct communication paths exist with respect to plane 1200B, the communication bandwidth provided to plane 1200B can be as much as twice the bandwidth provided to plane 1200A (for which only one communication link exists).

Like the communication link established with respect to plane 1200A, above, the communication links established with respect to plane 1200B would be transferred among different GRAAs in Ground Stations 1100C and 1100B (and potentially among different ARAAs in the Air Station within plane 1200B as plane 1200B travels through the sky.

Should additional bandwidth be required to fill the bandwidth needs of the Air Station in plane 1200B (or 1200A), additional communication links between an ARAA within the Air Station at issue and a GRAA within a Ground Station not currently communicating with the plane can be established. In the example of FIG. 1, where each Air Station includes six (6) ARAAs, as many as six (6) communication links can be established between the plane at issue and six Ground is Stations to provide massive communication bandwidth to the plane.

In the example of FIG. 1 it should be appreciated that each Ground Station is capable of communicating simultaneously with multiple planes. Thus, for example, one of the GRAAs within Ground Station 1100C can be communicating with one of the ARAAs within the Air Station in Plane 1200B through communication link 1510, while another of the GRAAs within the Ground Station 1100C can be communicating with one of the ARAAs within the Air Station in Plane 1200C, through communication link 1530. Note that at the same time, the Air Station in Plane 1200C can also include an ARAA communicating with one of the GRAAs in Ground Station 1100D over communication link 1540.

In the example of FIG. 1, the number of GRAAs within each of the Ground Station is the same and the number of GRAAs in each Ground Station is greater than the number of ARAAs in each Air Station. In the illustrated example, each Ground Station 1100 includes sixteen (16) GRAAs and each Air Station includes six (6). It will be appreciated that this number is not critical and that the number of GRAAs can vary amount Ground Stations, the number of ARAAs can vary among Air Stations, and the number and ratio of GRAAs to ARAAs can vary as well without departing from the teachings of this disclosure. It will be appreciated that if additional antennas are included within each of the Air Stations, the space below each Air Station can be further segmented, and additional communication links with additional Ground Stations can be established, thus permitting the creation of an additional number of simultaneously-enabled communication links.

In the examples discussed above, each communication link involves a single ground station radio communicating through a single antenna, at a single frequency, to a single radio in an air station. Alternate embodiments are envisioned wherein each antenna in the air and ground stations will be capable of simultaneously supporting communications at different frequencies. In such embodiments, the use of multiple frequencies for each antenna will permit the establishment of multiple communication channels for each air-station/ground-station radio assembly pairs.

For example, as discussed in more detail below, embodiments are envisioned where each GRAA is capable of communicating with each ARAA simultaneously on multiple frequencies such that the communication bandwidth can further be expanded. In such embodiments, each is GRAA-ARAA communication pair could then support a communication link for each frequency at which simultaneous communication can occur. Accordingly, in the example of FIG. 1, if each GRAA/ARAA is capable of simultaneously communicating on two distinct frequencies, then up to twelve (12) communication links (or twice the number of directional antennae in each Air Station) could be provided to each plane.

The system and method of communication described above has many features and advantages.

One potential advantage is that the disclosed system can operate using only a limited number of frequencies, system wide. This is because of the directional nature of the antenna used within the system. Since the communication links within the system are enabled by directional antenna, such that each link involves radio signals within only a particular region of the sky, multiple links can utilize the same radio frequency as other communication links.

For example, in one exemplary embodiment, a limited set of frequencies will be used for all communication in the system. In this exemplary embodiment, all Ground Stations will use the same set of frequencies to communicate with the Air Stations within the airplanes. This sharing of frequencies is possible because in the described system, each ground/airplane communication link is provided by a specific antenna within a specific ground station and a specific antenna within an Air Station. In this embodiment, each of the antenna pairs (i.e., each link between an antenna in a GRAA and an antenna in an ARAA) can use the same frequency as much as possible. Such use of the same frequency by multiple communication links minimizes the number of frequencies that must be used by the system. This embodiment does not preclude the use of one frequency for transmission and another for reception.

A further advantage of the system described above is that each airplane in the system will have the ability to communicate through multiple ARAAs to multiple GRAAs within different Ground Stations. Thus if a particular radio, antenna, or other structure within a given ARAA-GRAA link goes down or is compromised, the Air Station within the airplane and/or the Ground Station involved in the communication link can readily establish other communication links to replace or augment the lost or compromised link.

Figure 2B:
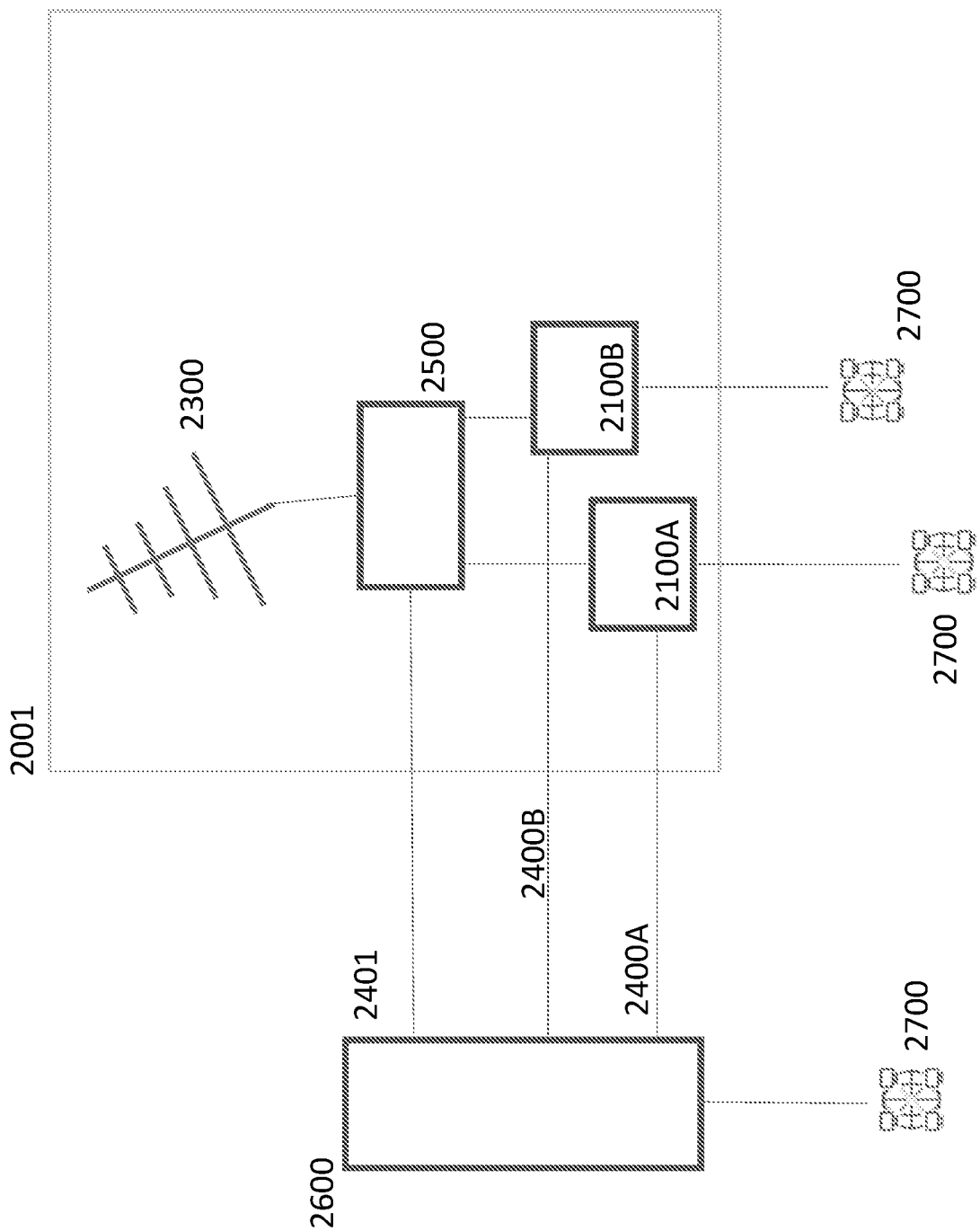
Figure 2C:
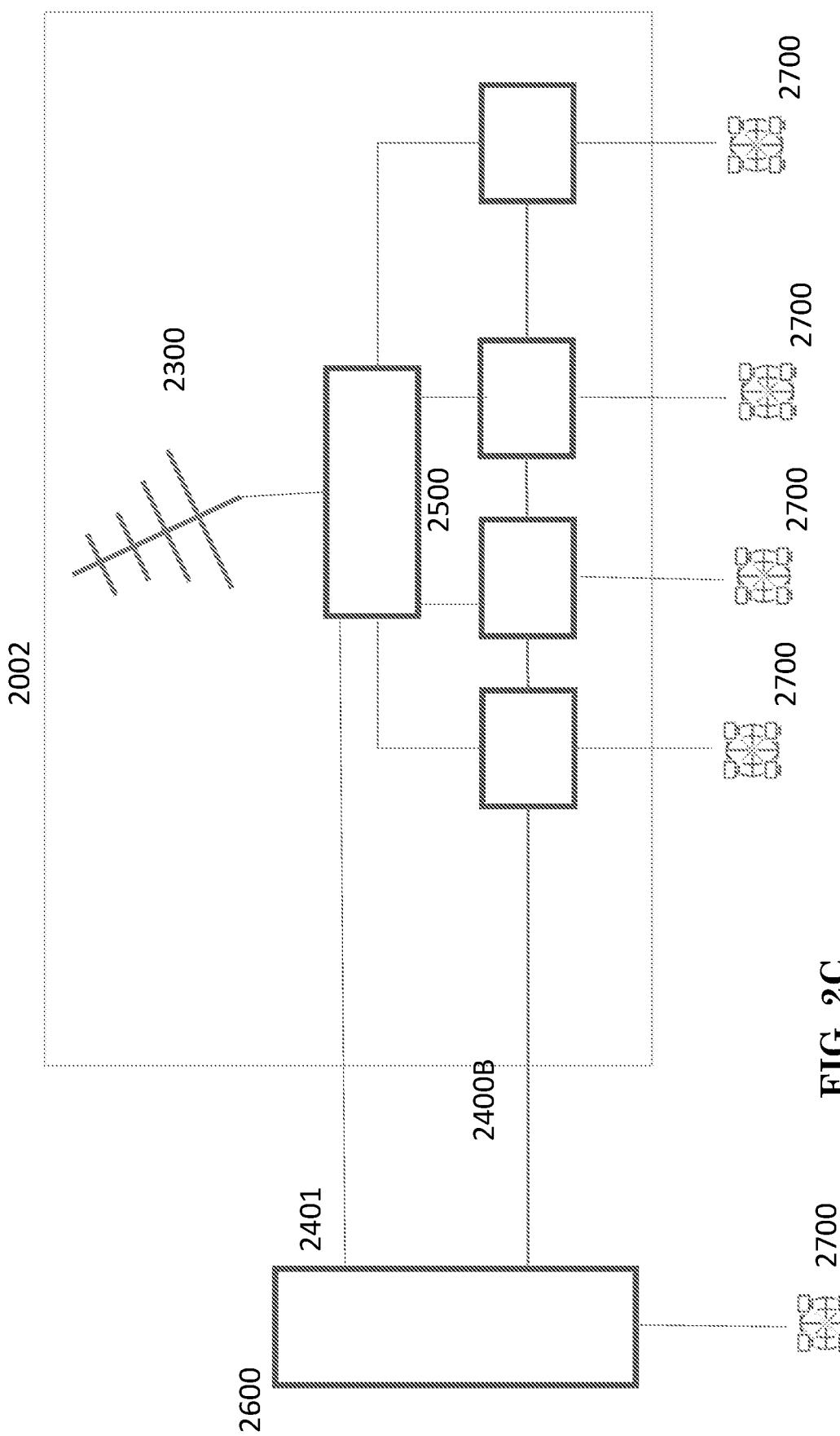

GRAA STRUCTURE AND OPERATION: FIGS. 2A-2C illustrate various exemplary forms is each of the GRAA within a Ground Station may take. As reflected in these figures, the basic form of each disclosed ground station is a control unit controlling the radios that form the ground station, and a plurality of radio-antenna assemblies. Each of the radio-antenna assemblies includes an antenna and at least one radio, where each of the radios is connected to the Internet. In this manner, each radio-antenna assembly in the ground station can communicate with a radio-antenna-assembly in an air station to support, for example, the provision of high-bandwidth Internet communications from the ground station to the air station. The control unit can vary the operating parameters for each radio within the ground station to address issues (such as interference), to allocate bandwidth, and to otherwise ensure efficient operation of the system.

Referring first to FIG. 2A, an exemplary GRAA 2000 is illustrated. The exemplary GRAA includes a Software Defined Radio ("SDR") 2100, a radio frequency (RF) amplifier 2200, and a directional antenna 2300 as shown. An internet connection 2700 is provided directly to the SDR.

In the example of FIG. 2A, a Ground Station Control Unit 2600 is provided that is coupled to both the SDR 2100 (via connection 2400) and the RF Amplifier 2200 (by connection 2401).

In operation, the Ground Station Control Unit 2600 can be used to configure and program the SDR 2100 such that it operates in a desired manner. For example, the Ground Station Control Unit can configure the SDR to transmit a signal at a specific frequency (or at specific frequencies), control the bandwidth of signals transmitted by the SDR and/or configure the SDR to process received signals at one or more specific frequencies or across a given frequency bandwidth.

In the example of FIG. 2A, the Ground Station Control Unit is coupled to the Internet via connection 2700. As such, the operation of the Ground Station Control Unit can be modified and adjusted via commands received over the Internet connection 2700. Accordingly, through the use of Internet commands and communication, the system of the present disclosure can coordinate the operation of the GRAAs within the various Ground Stations comprising the disclosed system and can, via communications with the Air Stations, coordinate operation of the Ground Stations and the various Air Stations.

As will be appreciated, in the Ground Stations of the present system Internet connections are useful for two different purposes. For example, one purpose is to permit the receipt and is provision of internet signals that are useful for configuring and controlling the various software defined radios in the Ground Station. Another purpose is to permit Internet communications between the Ground Stations and the Air Stations. For such purposes it is not necessary that the air-ground Internet communications pass through the Ground Station Control Unit. As such, such Internet communications can be provided via direct Internet connections to each of the radio-antenna assemblies within the Ground Station.

For example, in the example discussed above, will also be noted that the SDR 2100 includes its own communication link to the Internet 2700. As such, the SDR is capable of receiving radio signals from antenna 2300 reflecting Internet communications, processing them such that they are converted to digital data signals that can be passed to the Internet 2700, and communicating such signals to the Internet without any data input from the Ground Station Control Unit. In other words, in the example of FIG. 2A, while the Ground Station Control Unit 2600 is able to configure and control aspects of the operation of the SDR 2100, the data provided to, and provided by, the SDR need not be provided to, received by, or processed by the Ground Station Control Unit. Such data can pass from/to the internet through the SDR without ever being provided to or processed by the Ground Station Control Unit.

In the example of FIG. 2A, the Ground Station Control Unit also includes a connection 2401 to the RF Amplifier 2200. As discussed elsewhere here, for various reasons, it is often desirable to operate the GRAAs and the ARAAs in the disclosed system at the lowest power level required for acceptable communications. In one exemplary embodiment, the Ground Station Control Unit can monitor signals received and transmitted by the various GRAAs to which it is connected and can, through such monitoring, determine the minimum power required for such communications. The Ground Station Control Unit 2600 can then utilize the communication link 2401 to control the amplification level of the RF Amplifier 2200 such that the transmitted power of the GRAA is at, or approximately at, the lowest power level required for acceptable communications.

During transmission operations of the GRAA 2000, SDR 2100 will generate a RF signal to be transmitted by the GRAA. The RF signal will be provided by the SDR 2100 to the RF is amplifier 2200, that will then amplify the RF signal by a desired amount and transmit the amplified RF signal to the directional antenna 2300. The directional antenna 2300 will then transmit the amplified RF signal such that the most powerful part of the signal is within the beam-width cone associated with the directional antenna 2300.

During receive operations, the directional antenna 2300 will receive radio signals received from within the reception area and transmit the received signals through the RF Amplifier 2200 to the SDR 2100.

Because the amplification level of the RF amplifier is variable, the level can be adjusted in response to need. For example, during communications, the amplification level can initially be set at the highest possible level to establish communications, and the level can thereafter be decreased until the lowest amplification level necessary to permit communications is reached. In this manner, the lowest amplification level required for acceptable communications can be identified and used to minimize the interference that may result from more significant amplification.

Thus, in the illustrated example should be noted that the RF amplifier need not be used to provide a constant amplification level at all times. For example, embodiments are envisioned wherein the RF Amplifier will vary the level of amplification depending on the condition of the plane within in which the GRAA is located and/or other conditions. For example, where the GRAA is located geographically proximate to the plane in with which the GRAA is communicating, the RF amplifier may amplify the signal by a relatively small amount. As the plane travels away from that Ground Station the level of amplification may increase. This approach can be used to both conserve power and to try to limit the interference that could arise if a number of highly amplified signals from different planes were to be transmitted in the same general airspace.

It should also be noted that the RF Amplifier 2200 need not amplify signals during both transmission and reception operations and, when amplification is used, need not be used to amplify equally for transmission and reception. Thus, embodiments are envisioned where the amplifier 2200 is operational to amplify signals during reception, but not transmission, and vice versa. Embodiments are also envisioned where the amplifier 2200 is used to amplify signals at one level during transmission and another level during reception. Embodiments are also envisioned wherein is the amplifier 2200 also acts as a filter and amplifies signals only within one or more certain desired frequency ranges and does not amplify (or attenuates) signals outside such range or ranges.

As noted above, in the disclosed system the operating parameters of the communication can be varied. This is enabled, in one example, through the use of software defined radios in each of the Ground Station Radio-Antenna assemblies. In terms of structure, the SDR 2100 within the exemplary GRAA under discussion can take the form a software defined radio capable of receiving and transmitting signals that can be quickly programed, in real time, to vary one or all of: the transmit power of the radio, the center frequency, the bandwidth, and the mode of operation (such as the form of transmitted data, the form of signal modulation, the periods of transmit/receive, and other aspects of the radio operation). For SDRs that can transmit and/or receive signals at more than one frequency simultaneously, the SDRs may also enable adjustment of the center frequency and bandwidth for each of the multiple operational frequencies.

As noted above, in addition to varying the frequency/frequencies at which communications across a given communication link can occur, the Ground Station can vary the bandwidth of the enabled communications. For example, in one embodiment the SDR used within the GRAAs should be selected such that it can be programed to enable communications within a given selected bandwidth across a selected predetermined range of frequencies. For example, in accordance with one embodiment, each SDR used in a GRAA should be such that it can generate and receive RF signals within the frequency range of between about 700 MHz to 2.5 GHz and can communicate about a selected authorized frequency within that range using a bandwidth of up to about 6 MHz. It should be appreciated that these ranges are exemplary only and that frequencies and bandwidths outside these ranges can be used without departing from the teachings of this disclosure.

Because each GRAA will be used in a system in which other GRAAs (and ARAAs) are neighbors, there is the possibility that transmissions from one or more GRAA could interfere with RF signals being transmitted or received by another GRAA. To reduce the potential for such interference, each SDR may be programmed such that it can transmit about only a limited number of selected midpoint frequencies, with the various mid-point frequencies selected to minimize the potential for interference. One exemplary embodiment is envisioned wherein each SDR in each GRAA in the system is configured to operate at one of a preselected number of midpoint is frequencies, where the preselected midpoint frequencies are selected such that interference between any two or more selected frequencies is limited. For example, each GRAA within a given system can be selected such that it can operate at one of fifteen (15) preselected midpoint frequencies.

In the described example, the frequencies available to each Ground Station can be selected from frequencies assigned to the user of the system or from the frequencies available to the user for which there is limited expected interference.

While the embodiments discussed above envision use of SDRs with a high degree of programmability, other embodiments are envisioned wherein the SDRs used in the system are optionally designed to operate in one of a limited number of discrete modes. For example, for systems where it is anticipated that the SDRs will operate over only two or three predetermined frequency ranges, SDRs may be designed or selected that can operate only within those specified frequency ranges. Still further, for systems where the radios are anticipated to operate over only one, or a very limited number of predetermined frequencies, it may be possible to use more conventional radio transmitters/receivers that are designed to optionally operate over the specific predetermined frequency ranges.

In one embodiment, the communication signals transmitted by the SDRs will be encrypted and compressed both to protect the transmitted data and reduce the size of all or some of the transmitted data packets.

The RF Amplifiers: As generally described above the RF amplifiers in each radio-antenna assembly may be used to amplify the signals to be transmitted or the received signals. The RF Amplifier 2200 within the GRAA may take any suitable form. In one embodiment, the GRAAs are designed to operate at a relatively low radio frequency (RF) power level, for example, on the order of 1-5 Watts, and the RF Amplifier is selected such that the transmitted power from the directional antenna 2300 is within the desired range.

As reflected in FIG. 2A, the amplified radio frequency signal from the SDR 2100 and the RF Amplifier 2200 is provided to a directional antenna 2300. The directional antenna 2300 within the GRAA may take many forms. In general, the directional antenna 2300 within each GRAA is should be selected such that: (a) for purposes of transmitting a radio signal, it emits a focused, relatively narrow radio wave beam directed to a particular section of the sky about the Ground Station in which the GRAA is located (e.g., over a beam width roughly in the form of a cone extending from the antenna and covering particular degree span of the sky) and (b) for purposes of receiving radio signals, it amplifies radio signals received from a preferred directional space and attenuates radio signals received from other directions.

THE DIRECTIONAL ANTENNAE: As described above the directional antenna in each of the radio-antenna assemblies is intended to permit communication over a particular region of the sky above the Ground Station in which the antenna is located. Thus, for example, for a Ground Station including sixteen directional antennas or oriented to cover the entire sky above the ground station, each of the antenna can permit communications over cone extending from the antenna where the scan of the antenna is at or slightly greater than 45 degrees.

In one embodiment, each directional antenna in each of the Radio/Antenna Assemblies is a Yagi-type antenna. Alternative embodiments are envisioned wherein each of the directional antennas takes the form of a high-performance panel antenna capable of receiving signals across a specific range of frequencies and capable of providing a relatively high gain over a particular span of space. One exemplary panel antenna that could be used in such an embodiment is the PE51130 High Performance Panel Antenna, which is capable of receiving signals from between 1700 MHz and 2500 MHz and operating over a cone having a beam-width of 60 degrees with a gain of 9 dBi.

In yet another envisioned embodiment, steerable antenna may be used, which may be automatically moved.

In one embodiment, the directional antenna 2300 within each GRAA can be designed for optimum operation over a specific RF frequency band and around a specific RF midpoint frequency. In alternate embodiments, each antenna 4300 can be designed or selected to operate across a number of different frequency bands and around various possible midpoint frequencies.

In still other embodiments, each antenna 2300 may be designed or selected to optionally operate over a defined number of predetermined frequency bands and at a correspondingly defined number of predetermined midpoint frequencies. For example, in a system in which each GRAA is configured to operate at one of fifteen preselected midpoint frequencies, the antennas within the GRAAs used in the system may be selected to have suitable operating characteristics at those preselected midpoint frequencies.

THE SELECTED COMMUNICATION FREQUENCIES AND POWER LEVELS In general, any suitable frequencies or power levels may be used for the communications described herein, However, in preferred embodiments, the frequencies and power levels should be selected in such a manner that interference with other communications is avoided.

As indicated above, in certain embodiments each of the SDRs within the GRAAs in the system are programmable to operate at any one of a number of select frequencies and bandwidths. To minimize the potential for interference between the signals transmitted by the GRAAs in the system, one of more of the following approaches may be used.

POWER LEVEL ADJUSTMENT: First, to avoid having the signals transmitted by the GRAAs give rise to interference with other signals, the GRAAs should generally broadcast at the minimal power levels required for god communications. Such transmission powers will minimize the potential for transmitted signals to interfere with other signals. The power level of the transmitted signals can be adjusted through, for example, control of the RF Amplifier within each of the GRAAs. In one exemplary embodiment, test transmissions can be made between a GRAA and a receiver (such as an ARAA) within a given geographical area to determine the minimum power for acceptable communications and that determined power level can be provided to the System Control Unit for broadcast across the system such that all GRAA/receiver communications links in that area utilize the determined power level.

In still further embodiments, the power level for all communications between any Ground Station and any Air Station may be kept at the minimum required for acceptable communications to preserve energy and avoid interference.

AVOIDANCE OF AIR-TO-GROUND PRIMARY FREQUENCIES: Second, the frequencies used for all GRAA-ARAA transmissions can be selected such that they are not aligned with any Primary Frequencies used for Air-to-Ground transmission.

AVOIDANCE OF DETECTED FREQUENCIES USED FOR COMMUNICATION: Third, is the frequencies used for GRAA-ARAA transmission can be determined on a regular basis through the use of a frequency test protocol wherein, during certain periods where each of the GRAAs and ARAAs are not involved in the transmission or reception of a communication signal, the ARAAs (and potentially the GRAAs) will monitor the signals received at their antennas to try to identify which specific frequencies and bandwidths are being used for communications. In such embodiments, only those predetermined frequencies not the same or close to a frequency in use will be used for transmissions. In accordance with one variant of this approach, implementation of the frequency test protocol will result in a list being created of frequencies from the most used frequency in the area to the lowest used frequency in the area and the predetermined frequencies closest to the lowest used frequency will be preferred over frequencies near the most used frequencies in the area.

In one exemplary embodiment, the frequency test protocol can be performed every day, or every other day, such that the frequencies used by the GRAAs in the system are regularly updated. In certain other embodiments, a version of the frequency test protocol can be performed prior to each transmission of a signal by a GRAA. In such an embodiment, before transmitting over a given frequency, the GRAA seeking to transmit a signal will first look for communications from other devices at that frequency. If the detected signals at that frequency are greater than a certain level, the GRAA will not use that frequency but will instead select an alternate frequency and then reperform the frequency test protocol using the alternative frequency.

In one embodiment, only secondary frequencies will be used for GRAA transmissions. In such an embodiment, such secondary frequencies may be selected such that they do not correspond to any air-to-ground primary frequencies.

In one variant of this embodiment, the secondary frequencies used by the GRAAs can correspond to a Primary Frequency used for ground-to-ground communications since the air-to-ground signals transmitted by the GRAAs will be generally orthogonal to any ground-to-ground communicating devices using the selected frequency such that the potential for interference between the air-to-ground and ground-to-ground transmission is minimal. In such examples, the use of a Primary Ground-to-Ground Frequency should not cause problematic interference because the communications of such a system would always be from Air-to-Ground or Ground-to-Air or and not Ground-to-Ground.

In any embodiment where the system will communicate using a Secondary Frequency, before sending any initial message to a Ground Station with which the Air Station is not currently in communication, the Air Station will engage in a "listening" period where it detects radio signals received on its associated ARAAs. This is done to determine what radio frequencies may be currently in use by others in the geographical area associated with the Ground Station for which new communications will be established. Based on the results of the listening period, the Air Station may select a transmission frequency so as to avoid or minimize interference with frequencies on which communications are detected.

As discussed above to increase the flexibility and, potentially the bandwidth capability of the system, embodiments are envisioned wherein one, some, or all of the GRAAs in a given Ground Station are capable of transmitting (and/or receiving) radio signals across one or more mid-point frequencies and, potentially, one or more bandwidths.

COMBINING GRAAs TO FORM A GROUND STATION: As described above, a number of different Ground Radio-Antenna Assemblies can be combined to form a Ground Station.

Figure 3A:
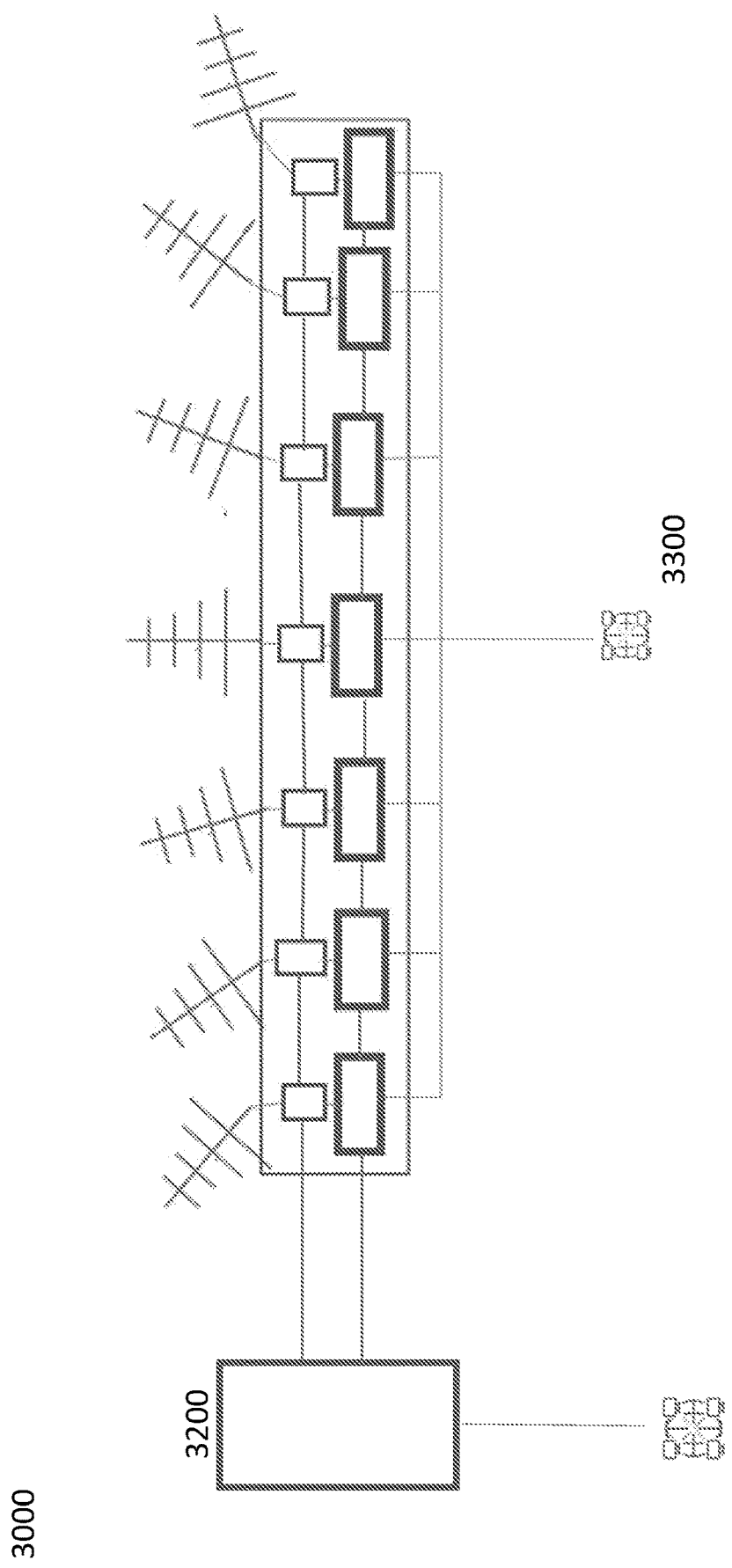
FIGS. 3A-3B depict exemplary approaches for distributing Ground Stations across a geographic region over which high bandwidth communications with objects traveling through the sky are desired.

FIG. 3A illustrates one exemplary manner in which a plurality of GRAAs may be combined to form a Ground Station. As reflected in the figure, an exemplary Ground Station 3000 is depicted that is formed from a plurality of GRAAs, seven of which are illustrated in the figure. As reflected in the figure, each of the illustrated GRAAs includes a directional antenna, a RF amplifier and an SDR with the communication links from all of the various SDRs being coupled to a common communication network. Also coupled to the communication network is a Ground Station Control Unit 3200. As depicted in FIG. 3A, the Ground Station Control Unit 3200 is coupled to communicate with each of the SDRs and each of the RF Amplifiers in each of the seven illustrated GRAAs. The connection and operation may be as described above in connection with FIG. 2A.

As further reflected in FIG. 3A, in the illustrated example, the Ground Station is Control Unit 3200 is connected to the Internet at connection 3300 and connections to the Internet 3300 are also provided for each of the illustrated GRAAs.

In the illustrated embodiment the Ground Station Control Unit 3200 can take the form of a programmable computer that is capable of configuring each of the SDRs within the GRAAs in the Ground Station 3200, providing and receiving communications to/from the SDRs within the GRAAs, communicating with the Internet 3300 so as to enable Internet communications to pass from and through each of the GRAAs and to permit the Ground Station to communicate with other devices, including but not limited to other Ground Stations and a general system controller (not illustrated in FIG. 3). As described elsewhere herein, the Ground Station Control unit can program and configure the GRAAs within the Ground Station in which it is contained to facilitate high-bandwidth communication between the Ground Station and an Air Station.

As noted above, each of the directional antennas associated with each of the GRAAs within the Ground Station may be arranged so that each GRAA is associated with a particular region of the sky above the ground station. One purpose of such an exemplary arrangement may be to ensure that the Ground Station has the ability to transmit signals to, and receive signals from each region of the sky above the Ground Stations where communications are to be enabled.

Figure 3B:
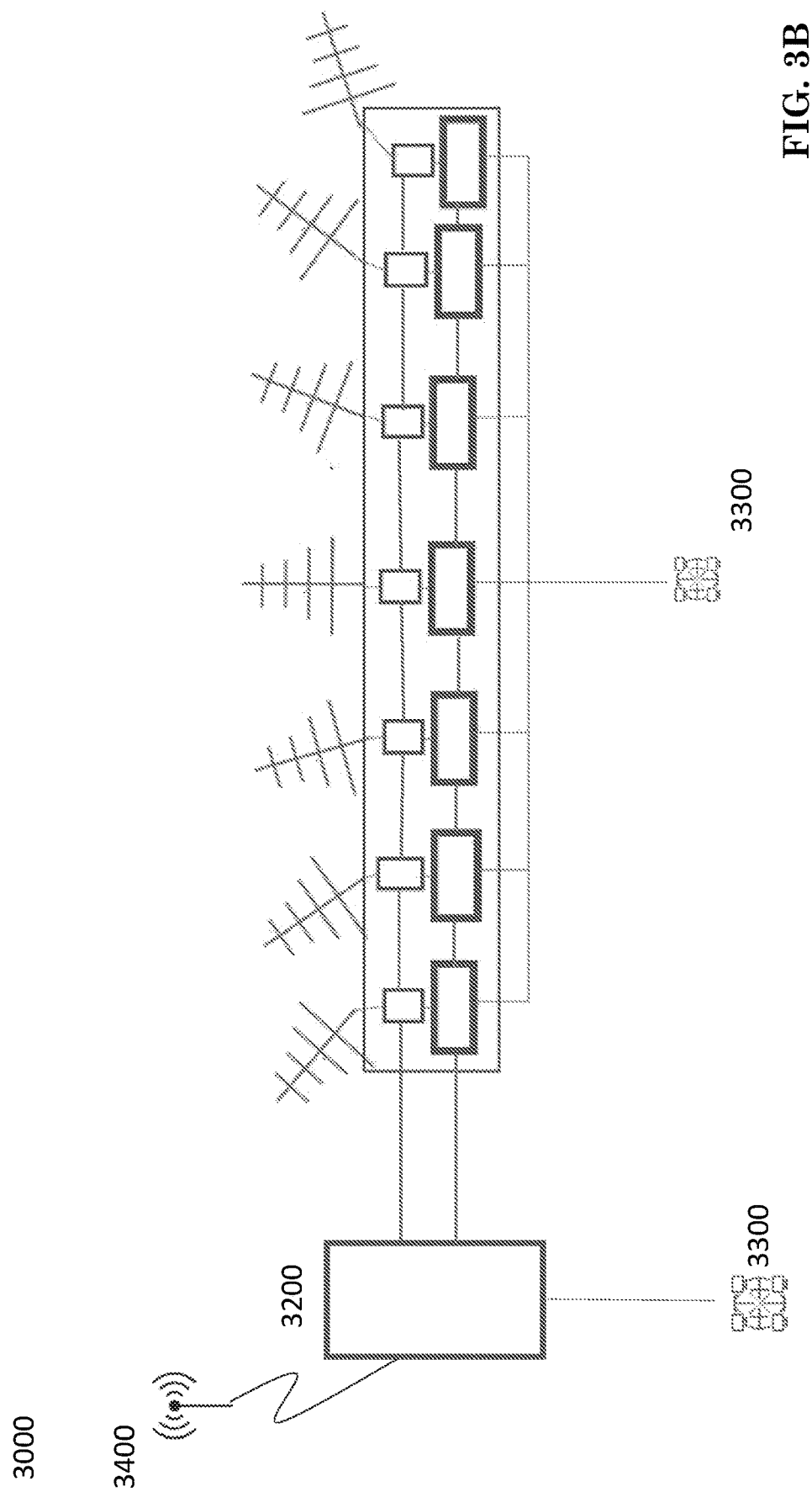

FIG. 3B illustrates a further exemplary embodiment of a GRAA that includes a separate antenna structure for receiving location information from planes traveling above the GRAA. As will be noted the exemplary GRAA of FIG. 3B is similar to the example of FIG. 3A with the notable difference being the inclusion of an additional antenna assembly 3400 coupled to the Ground Station Control Unit 3200.

Because planes being services by the system disclosed herein will be traveling across the region serviced by the system, it will be necessary to control the manner in which communication links are established with the air station on the plane such that, as the plane moves across the region, communication links can be established with ground stations in the region where the plane has traveled to and can be terminated for ground stations in the regions from which the plane has traveled. This can be accomplished in a number of different ways.

One way in which communications with the plane may be controlled is through the is use of ADS information, available from different sources. Presently many commercial and non-commercial planes automatically transmit an ADS signal that provides information relating to the identity of an airplane (e.g., tail number or other identifier) and the location of the plane in space. In the example of FIG. 3B, the antenna assembly 3400 is configured to receive such ADS signals and the Ground Station Control Unit 3200 is configured to process those signals. Thus, using the ADS signals received at the antenna assembly 3400, the Ground Station Control Unit 3200 can receive the ADS signal of a plane within its general vicinity, and process the signal to determine the location of the plane. The Ground Station Control Unit can then use that provided ADS information to configure and control the various SDRs within the Ground Station to optimize the high bandwidth communications to the plane as discussed in more detail below. For example, using the ADS information, the Ground Station Control Unit can, in some instances, determine an estimated flight path for the plane to which communications are desired to be made and use the estimated track to determine which GRAA should be used to communicate with the plane (and in what manner) at different points in time.

This process need not be started while the plane is in the air. In one of many envisioned embodiments, the reservation of bandwidth at a succession of Ground Stations may be made in advance of the departure of a plane simply by knowing the filed flight path of the plane and at which Ground Stations it is expected to be near at approximate times. The bandwidth reservations may be adjusted as the flight progresses.

In addition to receiving ADS signals from the antenna assembly 3400, the Ground Station Control Unit is also able to communicate with the Internet via the Internet connection 3300. Through that connection the Ground Station Control Unit 3200 can access plane flight databases available on the Internet which provide location information for planes traveling across various geographical regions. Using such data, alone or in combination with received ADS information, the Ground Station Control Unit can then determine or estimate the location in space of a plane to which communications are to be made and then control SDRs within the Ground Station to optimize those communications.

In one envisioned embodiment, the controller will be able to see and analyze network traffic is patterns over time and may use that information in requesting bandwidth from upcoming (in the forward direction of travel by the plane) Ground Stations. For example, if a group of devices on board the airplane have been using a relatively consistent amount of bandwidth over some time period, the controller may signal to the ground stations that it will need to reserve that amount of bandwidth from an upcoming Ground Station. If a single upcoming Ground Station is not going to be able to handle that amount of network traffic, the on-plane controller may further divide the group of devices and request some amount of bandwidth from one upcoming Ground Station, and another amount of bandwidth from a different upcoming Ground Station. If the anticipated amount of bandwidth is not available from any combination of upcoming Ground Stations, the on-plane controller may throttle the communications from the devices to provide fair and equal access.

As noted above, each Ground Station will include a plurality of GRAAs and each GRAA in a given Ground Station will include a directional antenna directed to a particular region of the sky above the Ground Station. In exemplary embodiments, the arrangement of the directional antennas will be such that communications will be enabled over all, a portion of, or the majority of the entirety of the sky above the Ground Station for a particular geographical region.

ANTENNAS FOR USE IN GRAAs: As described above, each of the ground station radio-antenna assemblies includes a direction antenna used for bi-directional communications. The specific form of directional antenna, and the specific arrangement of such antenna, is not critical provided that the antenna arrangement is such that each antenna is arranged to permit bi-directional communications over a specific region of space above the ground station, and the combination of all the antenna in a ground station permit high-bandwidth communications over a desired region of space above the ground stations. Examples of various antenna arrangements that may be used in a ground station are discussed below.

Figure 4C:
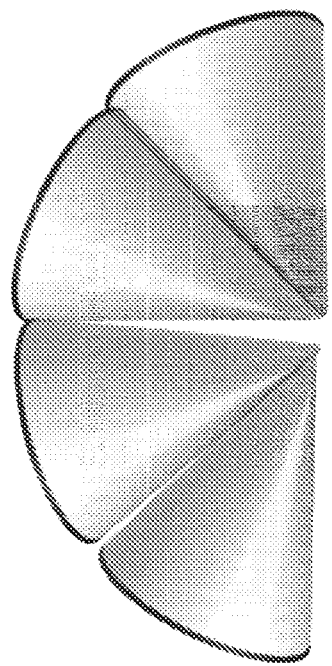
Figure 4B:
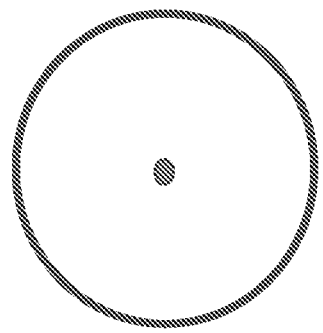
Figure 4A:
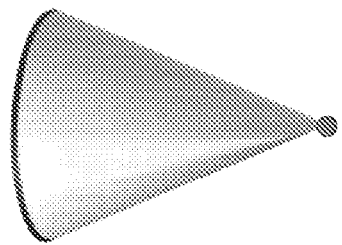

FIGS. 4A-4C generally illustrate the directional nature of an exemplary directional antenna that may be used to implement the system described herein. Referring first to FIG. 4A a "side view" of a particular region of space above a directional antenna over which the directional antenna can receive and transmit signals is illustrated. As reflected in the figure, in the example, the space serviced by the illustrative antenna is generally in the form of a cone, having a particular span, extending from the point that is representative of the physical location of the antenna. As is will be appreciated, while the space is illustrated for this example as a cone, the space associated with a given directional antenna may take other forms. Further, while the cone of FIG. 4A is illustrated as having defined edges and a termination point, it will be appreciated that the area of coverage of a given directional antenna may not be so defined.

FIG. 4B provides a representative "top down" view of the space covered by an exemplary directional antenna and FIG. 4C generally illustrates the manner in which four directional antennae may be aimed and oriented such that they cover approximately a 180-degree span of space above the antenna assembly.

Figure 4E:
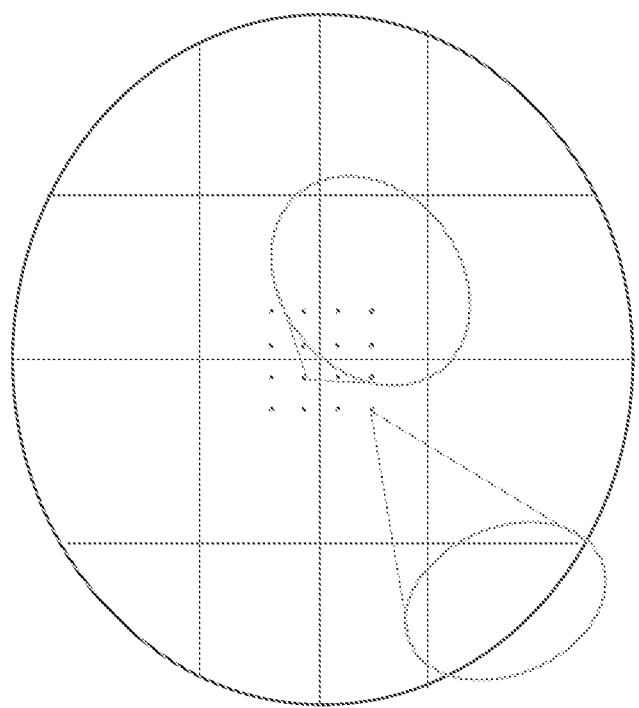
Figure 4D:
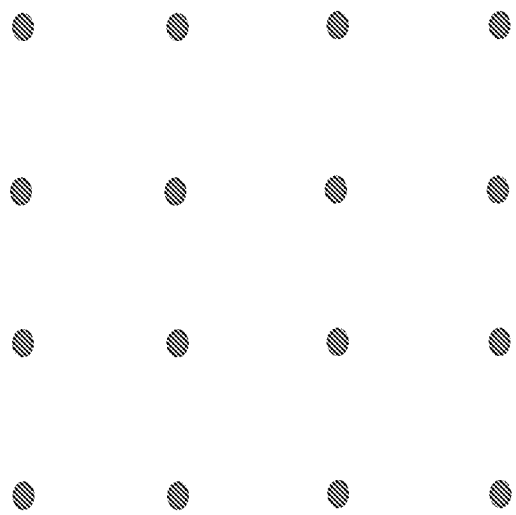

FIG. 4D illustrates an exemplary arrangement for the directional antennas of an exemplary given Ground Station having sixteen (16) GRAAs, with the directional antennas of each of the 16 GRAAs being designed to received/transmit radio signals from/to a preferred region of the sky. In the embodiment of FIG. 4A, the directional antennas within the exemplary Ground Station are arranged to permit communication to the entre sky above the Ground Station (180 degrees) and each of the sixteen GRAAs is designed to cover a portion of the sky above it comprising a cone with an approximately 12 degree span. As such, the sixteen GRAAs collectively cover the entire 180-degree span above the GRAA with a slight overlap between adjacent cones.

FIG. 4E generally illustrates the manner in which sixteen directional antennae may be arranged to cover the entire 180-degree area of sky above the exemplary Ground Station. As reflected in the figure, the sky above the Ground Station may be divided into sixteen regions and each directional antenna may be sized and oriented to cover one of the sixteen regions. In the illustrated embodiment each of the sixteen regions is intended to cover similar spans of the sky. The regions do not appear equal in size in the drawing, however, because this exemplary two-dimensional drawing is intended to simply represent a complex three-dimensional space.

Because the disclosed system is designed to communicate with airborne objects, and because such object will often not be typically at certain regions of the sky for extended periods (e.g., near the ground). Alternate embodiments are envisioned wherein the span of the sky to be serviced by the Ground Station is less than 180 degrees. For example, because planes rarely remain at very low altitudes for extended periods of time, it may be possible to provide suitable is connections from a Ground Station that is capable of covering the space above it from about 20 degrees above the horizon on all sides of the Ground Station. In such embodiments, the span of coverage will be on the order of 140 degrees. In such embodiments, if each Ground Station is to include sixteen (16) GRAAs having only a single directional antenna, the beam-width/reception cone of the antennas forming each GRAA can be on the order of approximately 9 degrees (e.g., 9 degrees plus or minus 15%).

Figure 4F:
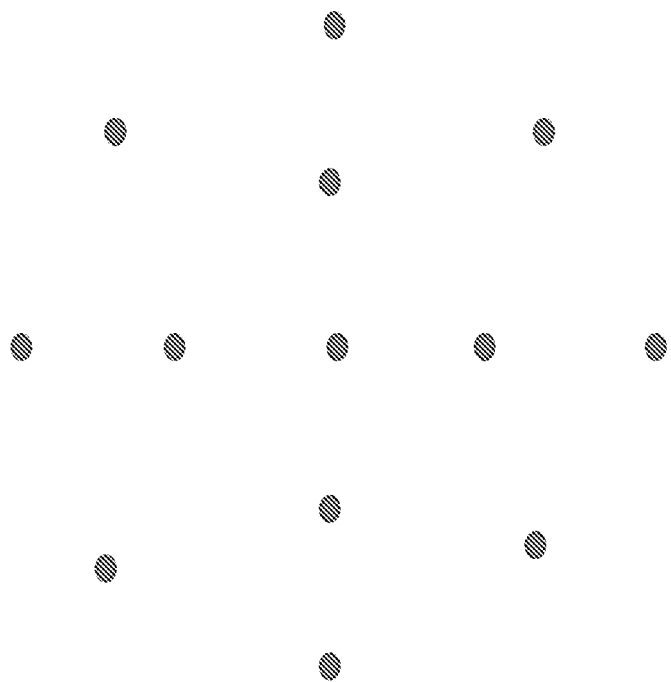

Additionally, while the exemplary Ground Station of FIGS. 4A and 4B included sixteen (GRAAs), alternate embodiments are envisioned wherein the Ground Stations can include a greater or lesser number of GRAAs. For example, Ground Stations formed from nine (9), twenty-five (25) or thirty-six (36) GRAAs are envisioned. In such embodiments, the beam width of the antennas for each GRAA should be on the order of the span of the sky above the Ground Station to be supported by the Ground Station divided by the number of GRAAs forming the Ground Station. Thus, for a Ground Station intended to cover a 120-degree span of space of above the Ground Station and thirteen (13) GRAAs, the beam-width/reception cone supported by each GRAA should be on the order of between about 9.5 and 10 degrees. Such an alternate embodiment is illustrated in FIG. 4F where a Ground Station comprising thirteen (13) GRAAs, each covering approximately a 10-degree portion of the sky is illustrated.

FIGS. 4G1 and 4G2 illustrate one exemplary GRAA formed from discrete antenna assemblies. In the example, of FIG. 4G1, each discrete antenna assembly is formed from four (4) Yagi-type antennas and where, for a given antenna assembly, each of the Yagi-antenna within the assembly will cover an approximately 45 degree cone of space, such that the coverage of any given assembly of four antenna is generally as shown in FIG. 4C. Each of the four antennae within a given discrete antenna assembly will be coupled to an RF amplifier and one or more SDRs to form a GRAA in a manner discussed above in connection with FIGS. 2A-3B. As reflected in FIG. 4G2, four of the discrete antenna assemblies reflected in FIG. 4G1 may be oriented such that the arrangement of the sixteen antennae within the GRAA cover the entire space above the Ground Station.

FIGS. 4H1 and 4H2 illustrate an alternate embodiment, where discrete antenna assemblies each comprising six Yagi-style antennae, can be used to construct an antenna is arrangement for a GRAA including thirty-six (36) antenna arranged in a six-by-six arrangement.

In the examples of FIGS. 4G1, 4G2, 4H1 and 4H2, the illustrated antenna are Yagi-style antenna. It will be appreciated that other types of directional antenna could be used such as parabolic antenna or Yagi-parabolic hybrid antenna.

Figure 4I:
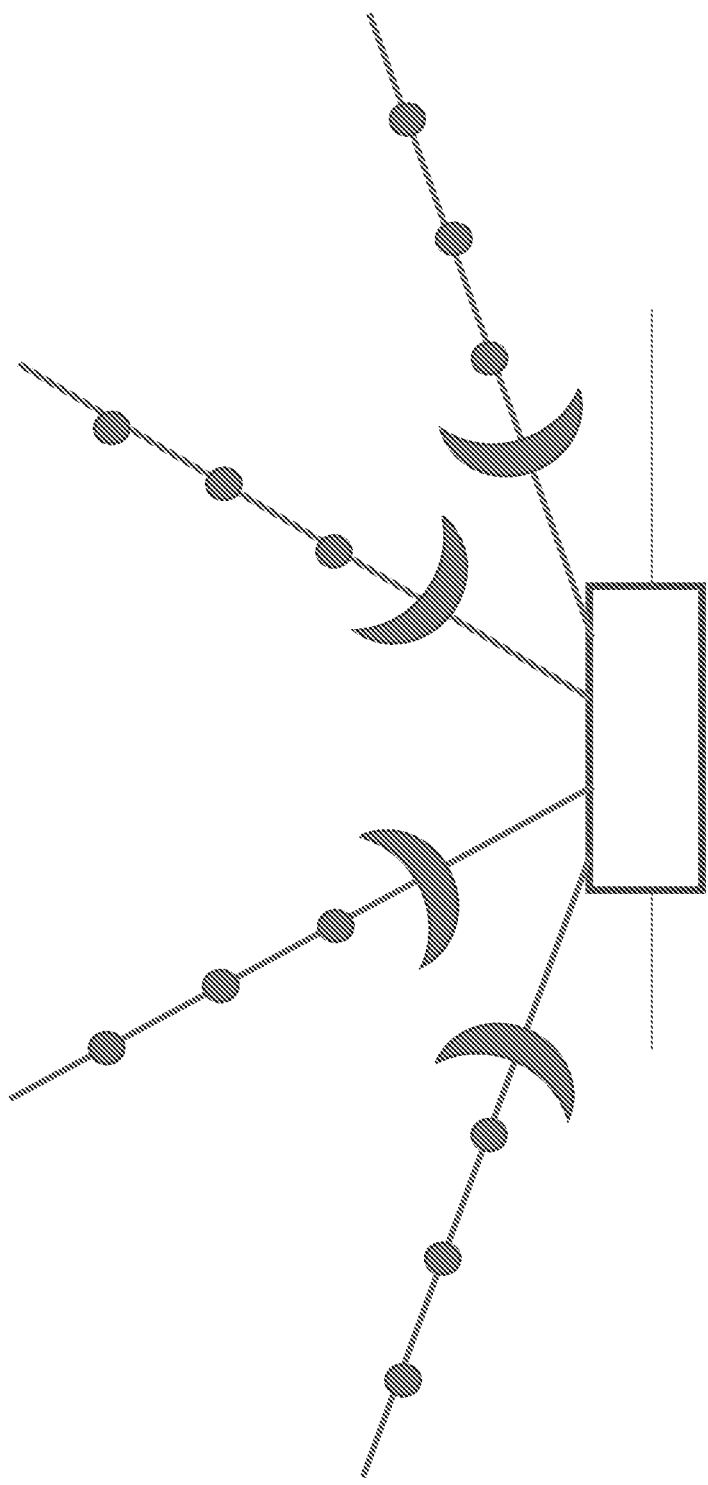

In the examples of FIGS. 4G1, 4G2, 4H1 and 4H2, certain of the antenna comprising the illustrated GRAA are shown as being contained in a single discrete antenna assembly. It should be appreciated that a GRAA in accordance with the teachings of this disclosure could be constructed from individual antennas that are not physically connected. An example of such an antenna assembly, consisting of sixteen individual, unconnected Yagi-parabolic hybrid antennae is reflected in FIG. 4I where each column—seen from the front in this example—is an assembly of 4 Yagi-parabolic antenna assemblies in a row (left to right). The four antenna in the nearest column are angled towards the viewer as described previously, and each consecutive column is angled such that the collection of antenna in the columns and rows cover the entire sky.

Use of Ground Stations having a larger or smaller number of GRAAs can permit the construction of Ground Stations in various areas to be tailored to the anticipated necessary bandwidth for those areas. For example, Ground Stations in areas with only limited air travel (such as in a rural area or a section of water over which few planes pass) may have a fewer number of GRAAs, while Ground Stations in heavily trafficked areas may be formed from a greater number of GRAAs.

In the examples discussed above, each GRAA included a single SDR and a single directional antenna and was constructed such that each SDR could be configured to provide an output signal at a desired frequency and over a defined bandwidth. Alternate embodiments are envisioned, where each GRAA remains associated with a single directional antenna but where the directional antennas of each GRAA are selected such that two or more signals (if different frequencies and, potentially different bandwidths) are simultaneously transmitted or received from the same GRAA.

It should be appreciated that each GRAA is capable of communicating with a plurality of aircraft positioned above it. Such multi-aircraft communications can be enabled through, for example, using different frequencies to communicate with different planes, is communicating with different planes at different times, a combination of time and/or frequency multiplexing, and other multiplexing approaches.

MULTI-FREQUENCY COMMUNICATION: As discussed generally above, certain antenna arrangements are capable of conducting simultaneous bi-directional communications at different frequencies. In such embodiments a first communication link, at a first frequency and bandwidth, can be established between a first ground station antenna and a first air station antenna and a second communication link can be established using the same antennas but using a second frequency and a second bandwidth. While the first and the second frequencies must be different for this approach to work, the first and second bandwidths may be the same.

FIG. 2B illustrates one exemplary GRAA that may be used to transmit and receive two frequencies simultaneously using the same directional antenna.

Referring to FIG. 2B a GRAA 2001 is illustrated that includes a directional antenna 2300 a combiner/RF amplifier 2500 and two software defined radios 2100A and 2100B. Each of the SDRs 2100A and 2100B includes a communication link (2400A and 2400B) for communicating with the Ground Station Control Unit (not illustrated in FIG. 2B). During a transmission operation, each of the SDRs 2100A and 2100B will generate a radio signal at a different frequency and each of those signals will be provided to the combiner/RF amplifier circuit 2500, which will combine the signals for transmission by the directional antenna 2300. During a reception operation, the directional antenna 2300 will receive signals having multiple frequency components, separate out the different frequencies and provide a signal at a first frequency to the SDR 2100A and at a second frequency to SDR 2100B.

In the example of FIG. 2B a Ground Station Control Unit 2600 is illustrated that is connected to both the combiner/amplifier 2500 and the two SDRs 2100A and 2100B. The operation of the Ground Station Control Unit 2600 is generally as described above in connection with FIG. 2A.

Through the use of dual frequencies, the same directional antenna can be used to provide two independent communication links and can, therefore, double the communication bandwidth that an individual GRAA alone can provide.

If the appropriate directional antenna is selected, a single antenna can support is simultaneous communications and more than two frequencies. FIG. 2C illustrates an exemplary GRAA where a single directional antenna 2300 is combined with four (4) SDRs (2100A, 2100B, 2100C and 2100D) to potentially provide up to four independent communication links. Like numerals represent like elements with respect to FIGS. 2A and 2B.

As discussed above, in the present example, during operation, communication links will be established between at least one GRAA in a Ground Station and at least one ARAA in an Air Station.

COMBINING ARAAS TO FORM AN AIR STATION: In a manner similar to that described above with respect to the implantation of a ground station, multiple air antenna-radio antenna assemblies may be combined to form an air station.

GENERAL AIR RADIO-ANTENNA ASSEMBLY CONFIGURATION: FIGS. 5A, 5B and 5C illustrate different exemplary forms that the Air Radio/Antenna Assemblies in each Air Station may take.

Referring first to FIG. 5A, an exemplary ARAA 5001 is illustrated that includes a software defined radio ("SDR") 5100, a RD amplifier 5200, and a directional antenna 5300. A communication link 5400 is provided to permit the communication of data signals and control signals that can configure the SDR 5100.

The identified elements in FIG. 5A operate in a manner similar to that described above with respect to the exemplary GRAA of FIG. 2A. In general, during a transmit operation, the SDR 5100 will generate a radio frequency signal embodying the data to be communicated that will be provided to the RF Amplifier 5200 that will pass the amplified RF signals to the directional antenna 5300 for transmission into space. During a reception operation, the directional antenna 5300 will receive a signal that is processed by RF Amplifier 5200 and passed to the SDR for processing.

As reflected in FIG. 5B, exemplary ARAAs can be constructed that, like the exemplary GRAA of FIG. 2B, include two SDRs 5100A and 5100B and a RF combiner/amplifier circuit 5500 that can combine and separate transmitted and received signals. While the example is of FIG. 5B illustrates the use of only two SDRs, thus enabling the simultaneous transmission or reception of signals at two selected frequencies, embodiments of ARAAs are envisioned wherein the ARAA includes more than two SDRs (in a manner akin to the exemplary GRAA of FIG. 2C).

It will be appreciated that if each ARAA (and each GRAA) is able to support multi-frequency communication, the number of communication links that such ARAA (or GRAA) can support will increase. Thus, a GRAA capable of communicating using one frequency at any given time can support a single link with a single Air Station at any given time. A GRAA capable of communicating at two frequencies may support two communication links with a given Air Station or one communication link with a first Air Station and another with a second Air Station at any given time.

FIG. 5C illustrates yet a further embodiment of an ARAA in which the signal from a single SDR 5100 is passed through two RF Amplifiers (5100A and 5100B) and a single directional antenna 5300. This embodiment is of potential benefit in that, while dividing the communication bandwidth between the two communication links enabled by antenna 5300A and 5300B, it provides two possible paths for communication for each SDR, such that an issue with one of the RF Amplifiers (5200A or 5200B) or one of the directional antennas (5300A or 5300B) would not preclude the SDR from engaging in communications.

Although not illustrated in FIGS. 5A-5C, it should be appreciated that each of the RF Amplifiers and SDRs would be coupled to an Air Station Control Unit to control the RF Amplifiers/Combiners and SDRs in a manner similar to the manner that the Ground Station Control Unit configured and controlled the operation of the RF Amplifiers/Combiners and SDRs contained in the exemplary GRAAs discussed above.

Figure 6:
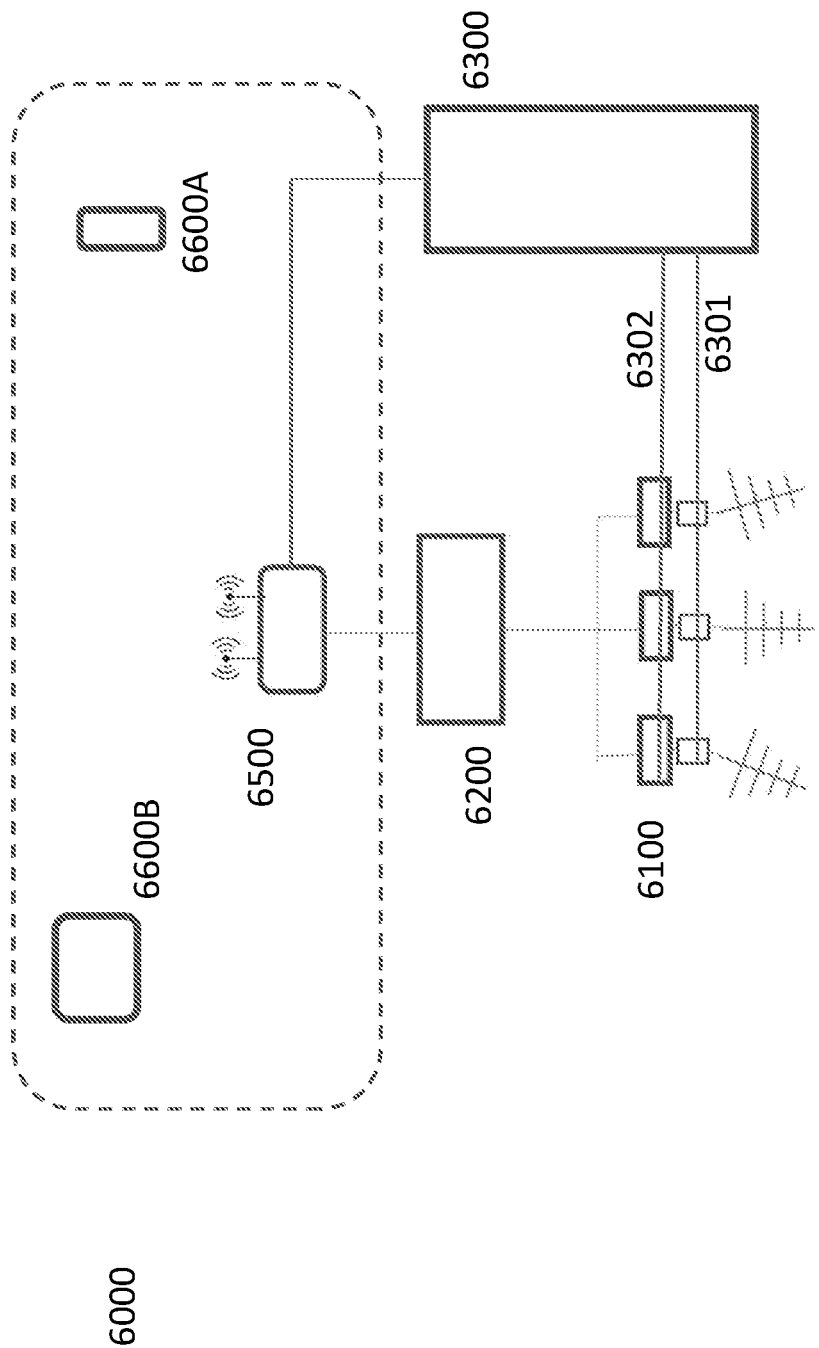
FIG. 6 generally illustrates one exemplary manner in which multiple ARAAs may be combined to form an Air Station.

CONFIGURATION OF AN AIR STATION: Multiple air radio-antenna assemblies may be combined to form an Air Station. FIG. 6 generally illustrates one exemplary manner in which multiple ARAAs may be combined to form an Air Station.

Referring to FIG. 6A, an exemplary Air Station 6000 is illustrated. The exemplary Air Station is illustrated as having three ARAAs and a combiner/RF amplifier circuit 6200 although it will be appreciated that the number of ARAAs used to form an Air Station can vary. For example, as discussed below, embodiments are envisioned wherein each Air Station includes is six (6) ARAAs.

In the embodiment of FIG. 6, a first communication link 6301 exists between an Air Station Control Unit 6300 and each RF Amplifier and a second communication link exists between the Air Station Control Unit 6300 and each of the SDRs within the three ARAAs. A communication link is also provided between the Air Station Control Unit 6300 and the wireless communication device 6500. Through use of these communication links, the Air Station Control Unit 6300 may configure and control the RF Amplifiers, the SDRs and the Wireless communication device in the Air Station and also transmit and receive data and control signals via the SDRs and/or the wireless communication device 6500.

In the embodiment of FIG. 6, the communication links of each of the three ARAAs in the station are coupled to a common Air Station Control Unit. The communication link, in turn, is coupled to an Air Station Control Unit 6300, which may take the form of a programmed computer capable of configuring the SDRs within the Air Station and of generating, receiving and processing communication signals to be transmitted (or received) by the Air Station. Note that the exemplary Air Station of FIG. 6 can enable a significant number of communication links at significant bandwidth. For example, with six (6) directional antennas— each potentially capable of communicating data from 1-4 SDRs under the control of the Air Station Control Unit— there could be at least 24 different communication channels.

In FIG. 6, the Air Station Control Unit is in turn coupled to a wireless communication device 6500 which may take the form of a Wi-Fi router. In certain embodiments, the wireless communication device may be located within the cabin of a commercial or personal airplane and may enable communications between one or more wireless devices being operated by passengers in the cabin. Such passenger devices may, for example, take the form of a smart phone 6600A or a tablet or laptop computer.

In an embodiment where the Air Station Control Unit is comprised of a router to access the Internet, the function of the Air Station Control Unit may be regarded as similar to the function of what is known to those ordinarily skilled in communications as customer premise equipment. The RF link between the Air Station and the Ground Station may represent a routable hop, or the Air Station Control Unit may form a tunnel across the RF link and through the Ground is Station to an upstream unit that may aggregate and distribute the Internet protocol datagrams similar in manner to how communications are aggregated and distributed in the Internet to stationary end routers, such as at homes and businesses. Any number of aggregation and tunneling protocols as known to those ordinarily skilled may be deployed in any number of scenarios within the inventions disclosed herein.

In one of many possible embodiments, the aggregation of communications paths from a GRAA to other GRAAs and/or to the Internet may be accomplished in ways similar to the interconnection of radio telescope arrays such as the LOFAR radio telescope around Groningen in the Netherlands, or as is being built in the Square Kilometre Array in Australia.

Although not shown, the Air Station Control Unit 6300 may also be linked to communicating devices (such as laptops, computers, and discrete devices) via a hardwired connection.

In general operation, the Air Station 6000 of FIG. 6, operating in conjunction with at least one, and preferably more, Ground Stations may enable high bandwidth communications between devices coupled (wirelessly or via hardwire) to the Air Station Control Unit and ground systems and networks, such as the Internet. Specifically, as generally discussed above in connection with FIG. 1, the devices 6600A, 6600B and other devices can communicate with the Air Station Control unit (via wireless device 6500 or a direct connection) and provide information to be requested, transmitted or received. The Air Station Control Unit can then process the information and provide it to one or more of the ARAAs for communication to the ground via one or more communication links, where each communication link reflects a radio frequency communication channel established between at least one of the ARAAs in the Air Station and one of the GRAAs in a Ground Station within the geographical reach of the ARAAs in the Air Station.

Through communication links as described above, high frequency communications can be enabled between devices communicating with the Air Station Control unit 6200 and ground-based networks and systems (such as the Internet) coupled to one or more of the Ground Stations.

EXAMPLE ORIENTATIONS OF ANTENNAE FOR AN AIR STATION: The directional antenna within each air station may be oriented with respect to each other to provide is communication coverage for a particular region of the sky below the airplane. As such the total bandwidth available to the plane will be the total bandwidth available within each region of the sky below the plane that is supported by an antenna in the air station, multiplied by the number of antennae in the air station.

Figure 7C:
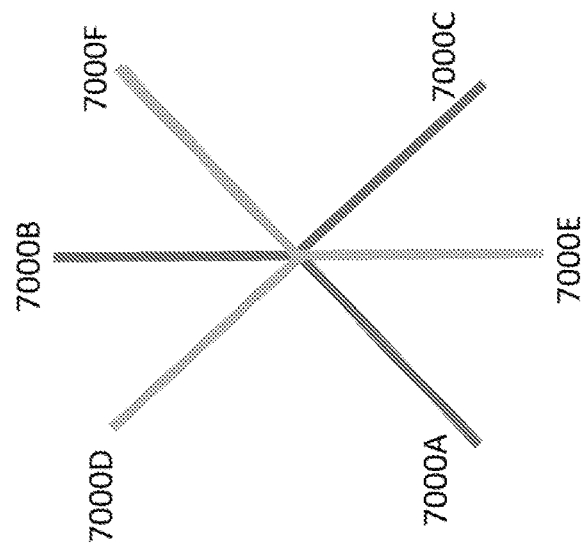
FIGS. 7A, 7B, 7C and 7D illustrate the manner in which the directional antennas within a given Air Station containing either three (3) or six (6) ARAAs may be oriented and arranged to provide radio-communication coverage for substantially all of the space below a plane on which the Air Station is located.
Figure 7B:
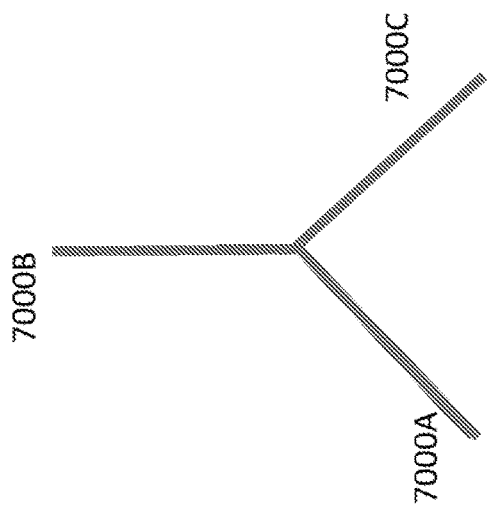
Figure 7A:
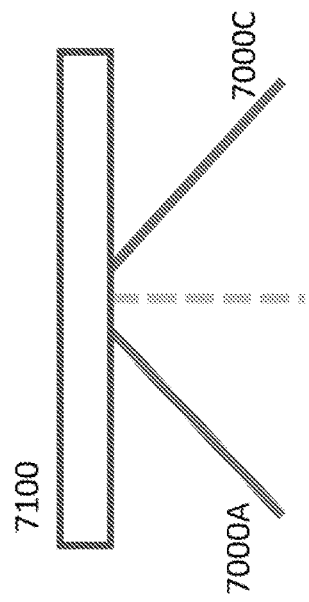

FIGS. 7A, 7B and 7C illustrate the manner in which the directional antennas within a given Air Station containing either three (3) or six (6) ARAAs may be oriented and arranged to provide radio-communication coverage for substantially all of the space below a plane on which the Air Station is located.

Referring first to FIG. 7A, a side view of an exemplary plane is shown as element 7100 from which three directional antennas (7000A, 7000B and 7000C) extend. In the example, each of the three antennae extend downwardly from the plane such that the angle between the plane and the directional antenna of approximately 30 degrees. This angular displacement orients the directional preference of each of the antenna to a region of space below the plane.

FIG. 7B illustrates the orientation of the three directional antenna of FIG. 7A from a "top-down" view. As reflected in the figure, the three antennae are oriented with respect to each other such that that the angular expanse (when viewed from a top-down perspective) is on the order of 120 degrees.

In accordance with one exemplary embodiment, the directional space over which each of the three antennae will be able to effectively transmit and receive signals will take the form of a cone having an angular expanse (extending from the physical location of one directional antenna) of roughly 120 degrees. In such embodiments, the three-antenna array illustrated in FIGS. 7A and 7B would be capable of providing coverage of the entire region of space below the plane on which the Air Station is located. However, in such an embodiment the three-antennae array would be capable of providing only a limited number of independent communication links. Specifically, if each directional antenna were capable of receiving and transmitting signals from its associated SDR at only one frequency, only three independent links would be available. If simultaneous dual-frequency communications (as described above) were enabled the number of links would be limited to the number of antennae multiplied by the number of frequencies that could be transmitted (or received) simultaneously.

To increase the number of available communication links—and to increase the overall bandwidth available from the system—the number of ARAAs in the Air Station (and thus the number of directional antenna) can be doubled, such that there are six (6) ARAAs— and six (6) directional antenna in the Air Station. Such antennas can be oriented to each have a thirty-degree downward angle with respect to the plane (as shown in FIG. 7A for antennas 7000A-C) and to be oriented from a "top-down" perspective, such that the primary direction of each antenna is separated from each adjacent antenna by an angular span of sixty (60) degrees. This is generally reflected in FIG. 7C.

Figure 7D:
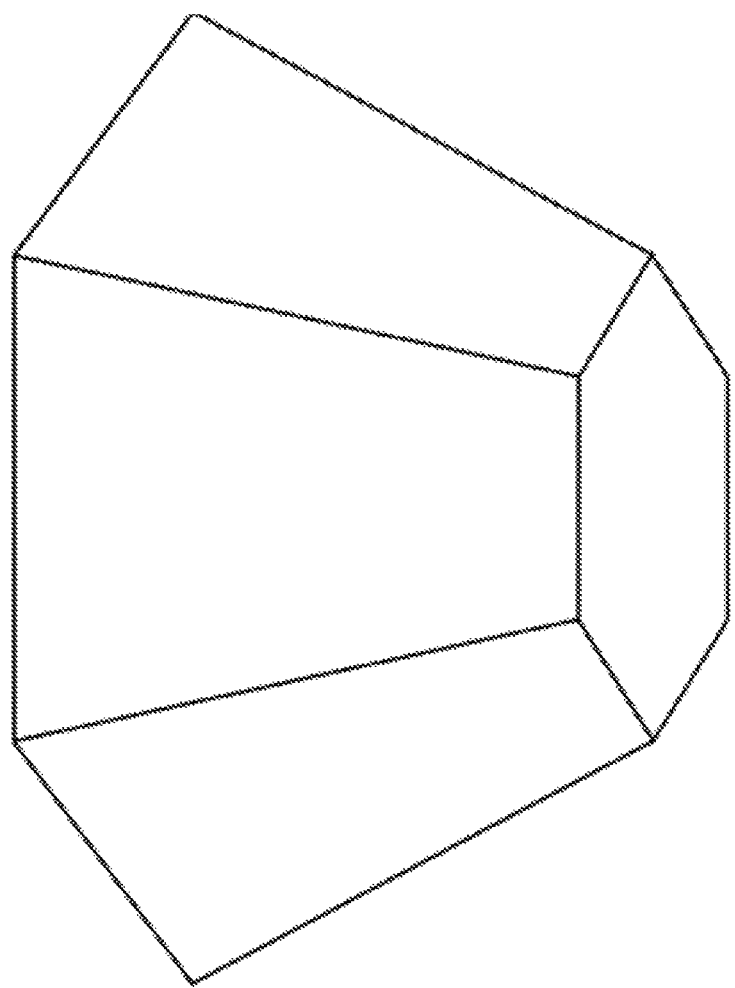

FIG. 7D illustrates a perspective view of how six flat panel antennae may be arranged to form an antenna assembly for an ARAA having the orientation generally described above in connection with FIG. 7C.

Similarly, a GRAA may be made of flat panel antennas. Enabling the top surface of the assembly to be another flat panel antenna would result in 7 flat panel antenna surfaces with the top surface pointing directly upwards. Those ordinarily skilled in the art will understand through the disclosures presented herein that such an antenna array need not be positioned on a substantially flat surface. That is to say that the top surface need not be level with the surface of the ground. The antenna array may be located on an incline, such as the side of a mountain, such that what is seen as the "top" surface may be aligned away from the zenith.

It should be appreciated that the directional antennas for a given Air Station need not all be physically located at the same general point. In particular, as long as the directional orientation is such that communication over the entirety (or substantially all or a desired region) of the space below the plane is enabled, the antennas can be physically located apart from each other. This is generally reflected in FIGS. 8A and 8B, which illustrate the manner in which the directional antenna for an Air Station including six (6) GRAAs can be physically positioned and oriented on a plane.

POSITIONING AN AIR STATION ON AN AIRPLANE: The air stations described above can be positioned on an airplane in a variety of different ways, depending on the particular airplane involved and a number of other factors. As an example, all of the antenna forming the air station can be combined to form a single unit that is physically attached to the plane at the same location. Alternatively, a subset of the antenna forming the Air Station (such as ⅓ or ½) can be combined to form a single physical unit and the various units forming the air station can be distributed about the outer body of the plane.

Figure 8A:
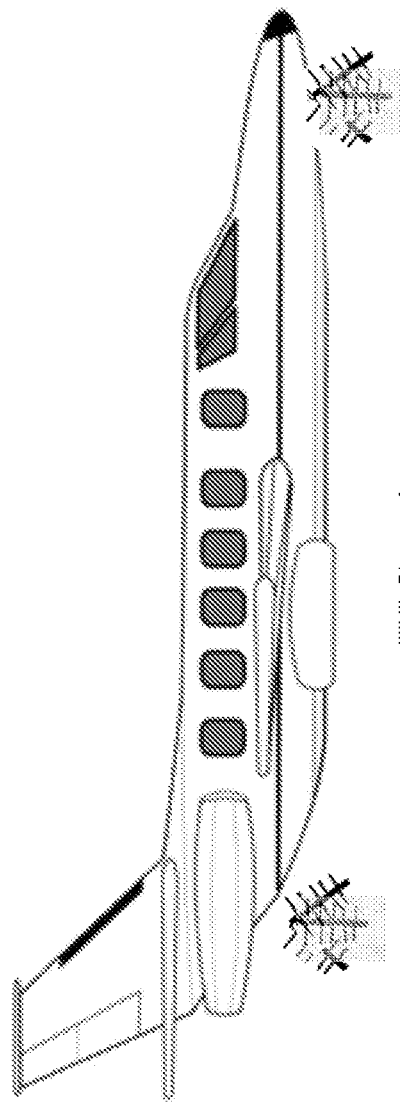
FIGS. 8A and 8B, which illustrate the manner in which the directional antenna for an Air Station including six (6) GRAAs can be physically positioned and oriented on a plane
Figure 8B:
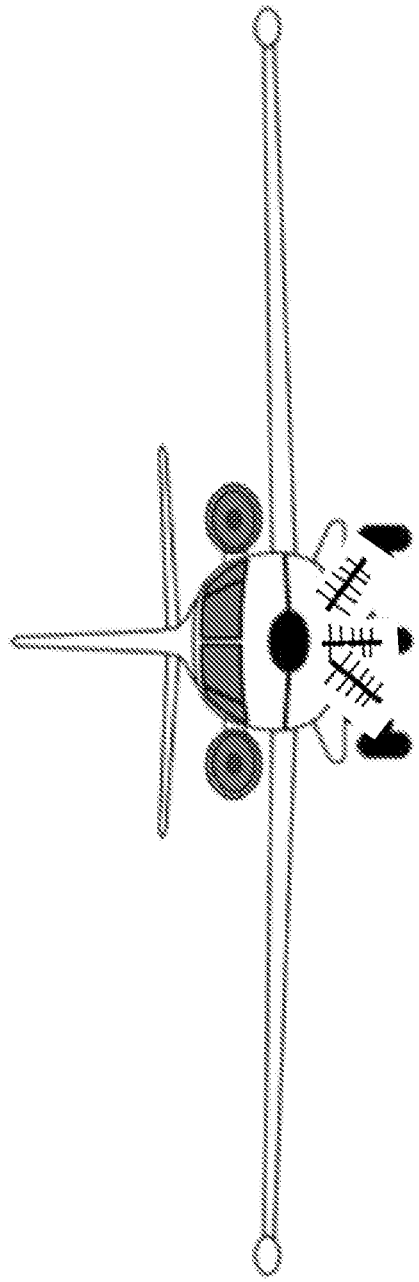

FIGS. 8A and 8B generally illustrate a plane. Coupled to the plane are two groupings of three antenna. In the illustrate embodiment, one of the groups of three antenna is positioned generally as described above with respect to FIGS. 7A-7C with respect to directional antennas 7000A, 7000B and 700C. In the example, this group comprises the three antennae near the nose of the plane. In the illustrated example the other group comprises three antenna, 7000D-E, which are oriented as reflected in FIG. 7C, but are physically located at the tail end of the plane. In the example each illustrated antenna covers a roughly 60-degree span of sky below the plane such that the entirety of the space below the plane is available for communication.

As described above, during operation of the system under discussion for a given plane, communication links will be established between an Air Station on the plane and one or more ground stations such that high bandwidth bidirectional communications with the plane can be enabled at all times over a given geographical area. Exemplary approaches for locating and orienting Ground Stations across a desired area are reflected in FIGS. 9A and 9B.

Figure 9B:
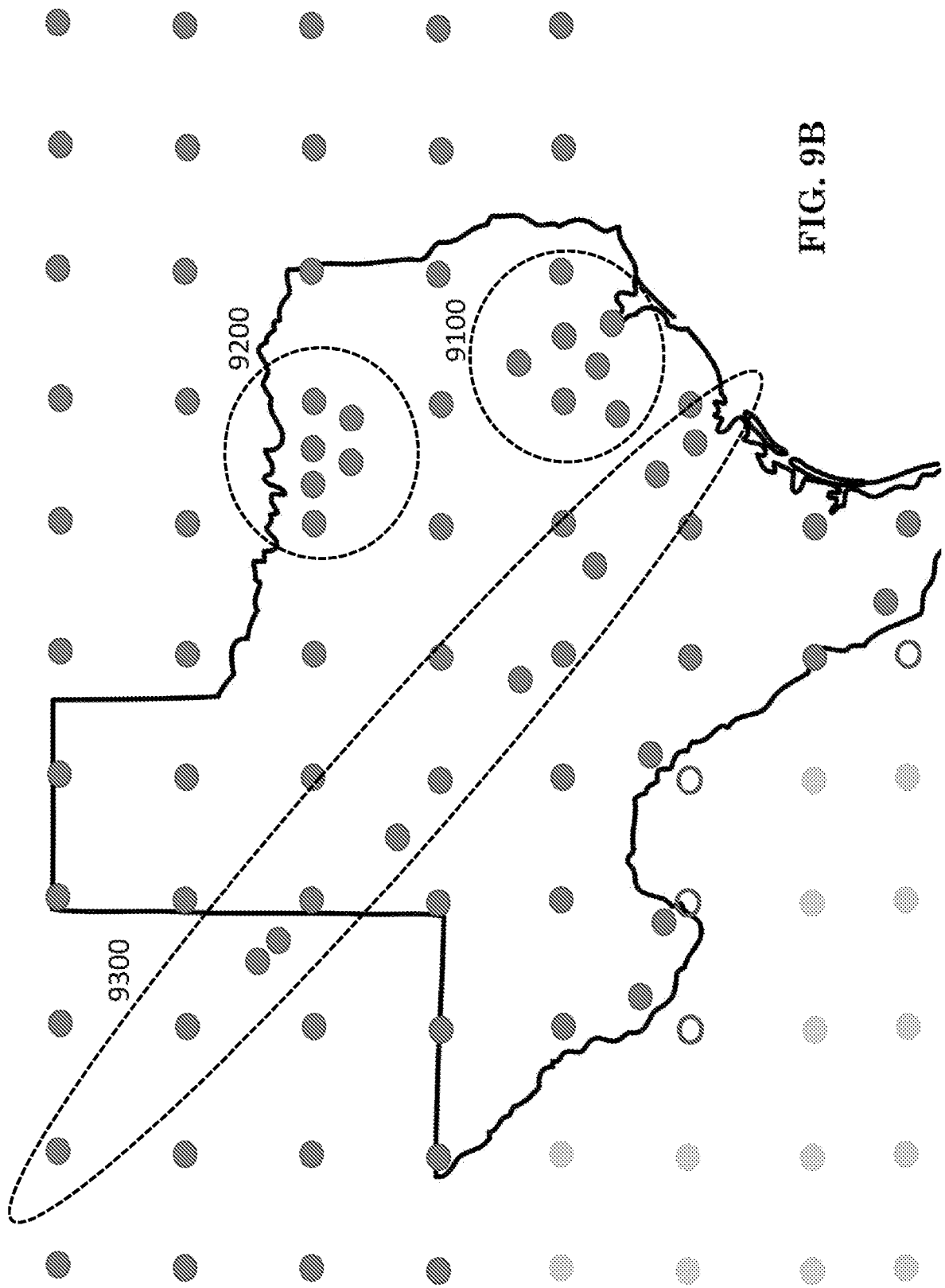

DISTRIBUTING GROUND STATIONS ACROSS A REGION TO BE SERVICED: As described above, the ground stations of the present system may be used to provide high bandwidth communications over a geographic region supported by the system. Such ground stations may be arranged to provide equal bandwidth coverage over the entire region serviced by the system or to vary the available bandwidth depending on the anticipated bandwidth needs of areas within the covered region. FIGS. 9A and 9B depict exemplary approaches for distributing Ground Stations across a geographic region over which high bandwidth communications with objects traveling through the sky are desired.

FIXED GRID LAYOUT: Referring initially to FIG. 9A, an exemplary layout of Ground Stations across an exemplary geographic region desired to be served by the system is illustrated. In the example of FIG. 9A the exemplary area to be served is the state of Texas and adjacent states and waters. It will be appreciated, however, that the systems and devices disclosed is herein can be used to provide high-bandwidth communications in the sky above any geographical region. In the example of FIG. 9A, each dot reflects a single ground station and the Ground Stations are laid out on roughly a 100 mile by 100 mile grid, with each Ground Station being separated from its most adjacent Ground Stations (on a North-South/East-West basis) by a 100 mile distance.

In general, the distance between ground stations should be selected such that, for any location with the Geographic Space desired to be served, at least two ARAAs of each plane to be served by the system is within the communication range of at least one Ground Station. This form of spacing is reflected by exemplary plane 900A which is shown as being able to communicate with at least the two Ground Stations to the south-east and south-west of the plane. This is to ensure that for each to be served by the system, at any desired location within the Geographic Region to be served, there exist at least two available communication channels. The ability to provide communications across at least two communication channels any given point provides both the ability to increase the bandwidth available to the plane at that location (if a single communication channel is insufficient to provide the desired bandwidth) and provide a redundant link in the event that there is a failure of equipment that disables one of the at least two potential ARAA-Ground Station links.

In one exemplary embodiment, the Ground Stations are positioned and configured such that each plane to be served by the system will have at least one (or greater if multiple simultaneous frequency communication is enabled for the plane) high bandwidth communication path available to it. Thus, for an exemplary system where each Air Station includes six (6) ARAAs, the Ground Stations should be positioned such that, at any given geographic point within the region to be served, each plane is capable of communicating with six (6) ground stations. This arrangement is reflected by exemplary plane 900B in FIG. 5A, which is shown as having the ability to communicate with at least the six Ground Stations most adjacent to the plane.

In another exemplary embodiment, the Ground Stations are positioned in such a manner that each ARAA within a plane is capable of communicating with at least two Ground Stations generally along a given direction. Thus, arrangement is generally reflected by exemplary plane 900C in FIG. 9A. As reflected in FIG. 9A, plane 900C is capable of communicating with at is least two Ground Stations to its East. It will be appreciated that, in other examples, planes can communicate with multiple Ground Stations in multiple directions. As discussed in more detail below, this arrangement can provide benefits in situations where the system is servicing a large number of planes and/or where one or more planes require a substantial amount of bandwidth.

DEMAND-INFLUENCED LAYOUT: FIG. 9B shows some exemplary alternate or adjusted spacing arrangements. As will be appreciated, in certain geographic regions the bandwidth demands may be higher than others. For example, near large cities where the number of private and commercial planes will typically be greater than in rural regions, it may be desirable to increase the number of Ground Stations to enable more communication links over that area. Such examples are shown in FIG. 9B with respect to the region associated with the Houston area (9100) and the Dallas-Fort Worth area (9200). As reflected in the figures, in such areas additional Ground Stations have been added. The number of Ground Stations can also be modified to account for greater bandwidth demands in regions where planes in the area are expected to be greater than in other regions. For example, near Collage Station Texas, the home of Texas A&M University, the technical skills and demands of those traveling in planes in the area may be such that additional Ground Stations would be warranted, as compared to geographic areas associated with lesser institutions of learning.

In addition to considering local bandwidth demands, the location and spacing of Ground Stations may be adjusted to account for expected air traffic paths. This is generally reflected by 9300 depicted in FIG. 9B which corresponds to a path of heavy commercial traffic across the state of Texas.

Still further, the location and spacing of Ground Stations may be adjusted to account for geographic and political boundaries. For example, if the region to be served is intended to be focused on a specific political area (e.g., the United States) it may be undesirable to have a Ground Station located in a foreign country. As such, Ground Stations that—if regular spacing intervals were to be used—would be outside the country to be served, could be moved to be within the boundaries of the country. This is shown in FIG. 9B with respect to the unfilled circles and their adjacent filled circles which reflect the adjusted positioning of a Ground Station with respect to an otherwise regular grid layout. Still further, geographic and/or political concerns (e.g., is mountains, lakes, sensitive environmental areas, access to available property, etc.) may influence the location and positioning of Ground Stations.

Although not explicitly reflected in the preceding figures, it should be understood that all of the Ground Stations may be capable of communicating (via their respective Ground Station Control units) with the other Ground Station Control units in the system. Additionally, or alternatively, the Ground Station control units may also be capable of communicating with one or more Central System Control Units. The (or each) Central System Control Unit may take the form of a computer capable of providing control and operating instructions and data to the various Ground Stations to control the manner in which the various Ground Stations communicate with the Air Stations in the system to ensure that planes traveling through the region serviced by the system (and therefore devices within such planes) are provided with high bandwidth communications, for example Internet communications.

Additionally, while not illustrated in FIG. 9A or 9B, it is possible in certain embodiments to position one or more Ground Stations on the water. Such stations could be positioned on floating structures and/or permanent or semi-permanent structures, such as floating oil wells, fixed or floating offshore platforms, or on temporarily positioned structures.

ENABLING BIDIRECTIONAL COMMUNICATIONS BETWEEN AN AIR STATION AND ONE OR MORE GROUND STATIONS: As described above, the present system is intended to enable the provision of massive bandwidth to the planes served by the system. One manner in which this can be done is by permitting the establishment of multiple communication links between each plane and the ground. This can be accomplished by configuring the system such that each plane is capable of establishing bi-directional communication links between each air antenna in each air station and a ground station, where each of the ground stations with which each antenna is in communication are different. In this manner, the total bandwidth available to the plane will be the sum of the bandwidths available from each independent communication channel.

Figure 10A:
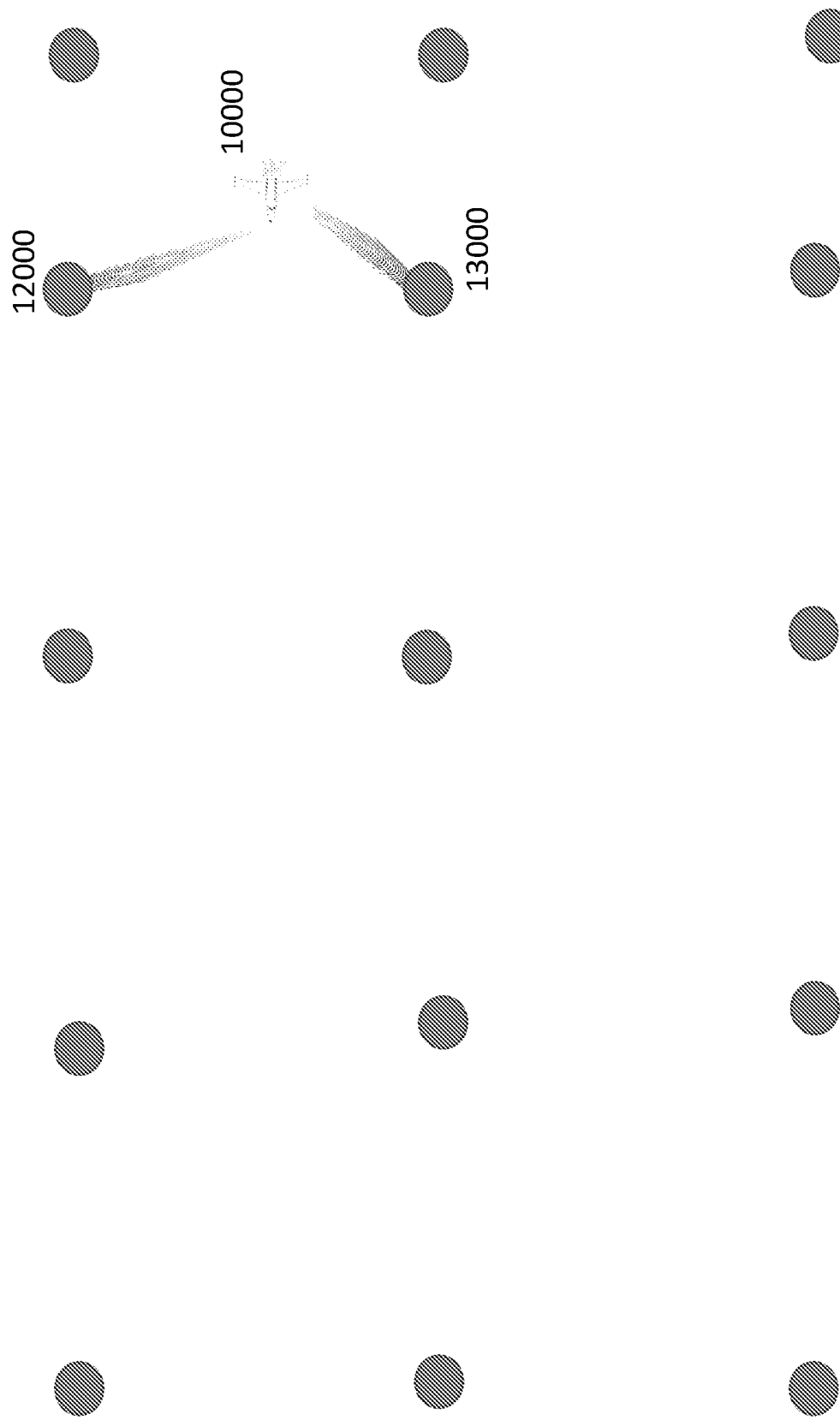
FIGS. 10A-10B generally illustrate the manner in which the described system may be controlled to enable high bandwidth communications to an exemplary plane 10000.
Figure 10B:
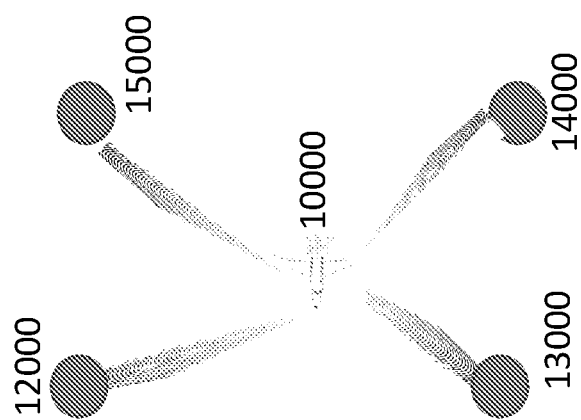

FIGS. 10A-10B generally illustrate the manner in which the described system may be controlled to enable high bandwidth communications to an exemplary plane 10000. For purposes of this example, it is assumed that each Air Station includes six (6) ARAAs and each is Ground Station includes sixteen (16) GRAAs.

At an initial time, reflected in FIG. 10A, the plane 10000 may be located at a given region of the space above the system. At such a location, the Air Station on the plane may wish to engage in communications with the system.

In accordance with one exemplary embodiment, each Air Station in the system will be provided with an updatable table that reflects the geographical location of each ground station in the system (at least for the geographical space over which the plane containing the Air Station may travel). The table may also include for each ground station one or both of: (a) an initial preferred Ground Station Command Frequency for communication with each Ground Station (or for Ground Stations with GRAAs that support multi-simultaneous frequency transmission/reception, multiple initially preferred frequencies); or (b) a list of a plurality of initially preferred Ground Station Command Frequencies. In one exemplary embodiment, each Air Station will maintain a table that associates each available Ground Station with: (i) the geographic region associated with that Ground Station and (ii) a list of ten (10) available Ground Station Command Frequencies for that Ground Station, with the frequency at the beginning of the list being the most preferred initial Ground Station Command Frequency. In such an embodiment, the list can rank available command frequencies from most preferred to least preferred, with the list being updated on a regular basis to reflect the detection of noise or interference in the geographic area associated with the Ground Station.

The table of initially preferred Ground Station Command Frequencies may be initially provided to each Air Station, and updated, during a period when ground-based or wired communications with the Air Station are enabled, such as when the plane containing the Air Station is located at a hanger and has ground-based wired or wireless Internet access. Additionally, or alternatively, the table may be updated through communications with one or more Ground Stations as the Air Station travels through the sky.

The initially preferred Command Frequency or Frequencies for each Ground Station may be selected in a variety of ways. Such initially preferred frequency/frequencies may be selected to avoid interference and/or to achieve other desired operating efficiencies. Various approaches for determining the frequencies to be used are described below.

INITIAL FREQUENCY ASSIGNMENT: In one embodiment, each Ground Station will be assigned an initially preferred communication frequency. This embodiment may be used, for example, when the operator of the system has obtained a license to use the specific preferred frequency in that region and there is little potential that use of the frequency will be subject to, or cause, interference with other radio signals in the region.

In another embodiment, each Ground Station may be assigned an initial Control Frequency based on the past communications involving that Ground Station. In this example, the past history of the Ground Station's communication with Air Stations will be considered and the frequencies at which the least interference was detected will be selected as potential initial Control Frequencies will be determined. Such frequencies will be available as initial Ground Station Command Frequencies and the frequency with the least interference will be assigned as the initial Ground Station Command Frequency.

ADJUSTMENT OF FREQUENCIES BASED ON FREQUENCY PERFORMANCE PROTOCOL: In yet a further alternate embodiment, the initially preferred frequency used by a Ground Station for may be determined by each Ground Station on a regular basis through use of the frequency interference protocol discussed above. In such embodiments, each Ground Station may be provided with a test communication device within its region to perform the frequency performance protocol on a regular basis and update its preferred initial frequency based on the results of performing the protocol. Such embodiments are useful when specific frequencies have been allocated to the operator of the system and the operator elects to operate at available frequencies, within an approved band, at low power. In such embodiments, each Ground Station may communicate with the other Ground Stations (either directly, or through indirect links) or with the Central System Control Unit to update the preferred initial frequency for that Ground Station.

Knowing its own geographical location, and possessing a table enabling identification of the available Ground Stations in its area and the initial preferred frequency for communications with those Ground Stations, the plane 10000 may determine the ARAA that covers the region below the plane where one available Ground Station is located and, using that ARAA, send a communication requesting the establishment of a communications link. A GRAA is associated with the region of the sky in which the Air Station is located within the targeted Ground Station may then receive the signal and establish a communication link between the targeted Ground Station and the Air Station within the plane. Note that in establishing such a communication link, the Ground Station may inform the Air Station that an alternate frequency should be used, and the Ground Station and the Air Station can then configure their respective SDRs to operate at the new desired frequency. Note that once a communication link is established, it can then be passed between the GRAAs and ARAAs used to establish the initial link and, thereafter, to GRAAs in a different Ground Station to provide continuous high bandwidth communications between the plane and the system as the plane travels across the geographical area serviced by the system.

Because each Air Station can communicate with a number of different ground stations, it is preferred that each air station's communications always be supported by at least two different ground stations. In such embodiments, a plane desiring to communicate with the system will initially attempt to establish a communication link between the Air Station on the plane and at least two different Ground Stations. Such an approach will both provide an initial high bandwidth for communications and will also provide a path for communications if there is a problem with one of the Ground Stations or one of the ARAAs within the Air Station. This approach is generally reflected by FIG. 10A, where the Air Station in plane 10000 is illustrated as having established communication links with two Ground Stations (12000 and 1300).

In one embodiment, the communication links established by the Air Station in plane 10000 will both be at initial frequency (which may be the same frequency) and utilize the same bandwidth about that frequency for communication. For the initial communications, the bandwidth about the selected frequency may, to conserve bandwidth and power, be of minimum bandwidth.

The ability of an air station to simultaneously support communication links with more than one different ground station allows for adjustment of the number of communication links supported by the air station, such that the bandwidth available to the plane can be increased or decreased as needed. For example, if the minimum bandwidth is insufficient to enable the level of communications desired by the Air Station, the Air Station, in communication with the Ground Stations involved in the links, may request that the bandwidth be increased to an intermediate is bandwidth. If the intermediate bandwidth is still insufficient to provide the desired level of communications, the Air Station and Ground Station may together adjust the SDRs involved in the communications to operate at an even higher bandwidth. These increases may continue up to the point of utilizing all available bandwidth.

In one exemplary embodiment, in the event that the increase of the frequency bandwidth as described does not permit the two established links to provide the level of communications desired by the air station on plane 10000, and both the Air Station on plane 10000 and the Ground Stations with which it is communicating are capable of implementing simultaneous dual-frequency communications, the Air Station and the Ground Stations with which it is communicating may then configure the SDRs involved in the communication to establish single frequency communication links with two additional Ground Stations before beginning providing dual frequency communications. When implemented, this approach would then potentially double the available bandwidth available to the Air Station as there would now be four communication links between the Air Station and the Ground Station. This is reflected generally, in FIG. 10B, where the Air Station within plane 10000 is shown as having established communication links with Ground Stations 12000, 13000, 14000 and 15000.

In an alternate exemplary embodiment, in the event that the increase of the frequency bandwidth as described does not permit the two established links to provide the level of communications desired by the air station on plane 10000, and both the Air Station on plane 10000 and the Ground Stations with which it is communicating are capable of implementing simultaneous dual-frequency communications, the Air Station and the Ground Stations with which it is communicating may then configure the SDRs involved in the communication to begin providing dual frequency communications before establishing single-frequency communications with additional Ground Stations. When implemented, this approach wound then would potentially double the available bandwidth available to the Air Station as there would not be two communication links (one at each frequency of communication) between the Air Station and the Ground Station.

In the embodiments above, where the transition is made from communications is between an Air Station and two Ground Stations to communications between an Air Station and four Ground Stations (or alternatively from single frequency communications to dual frequency communications,) the frequency bandwidth for each communication link (which would have been at the maximum frequency bandwidth) can be automatically reduced to an intermediate frequency bandwidth level. In alternate embodiments, the bandwidth can remain at the maximum frequency bandwidth level after the transition, but the Air Station and Ground Station can then determine if the communication needs of the Air Station can be met with a lower frequency bandwidth and, if so, reduce the frequency bandwidth. In general, the frequency bandwidth should be as small as possible to adequately support the desired communications.

If the example where single frequency links are established before any dual frequency links are established, if the transition to communication links between the Air Station and four Ground Stations dual frequency communications across the communication links between the Air Station on plane 10000 and Ground Stations 12000 and 13000 still does not provide enough communication bandwidth to support the communications desired by the Air Station on plane 10000, the Air Station may cause two of the ARAAS in the Air Station to send transmissions to additional Ground Stations to establish still additional communication links. This would result in the establishment of six single-frequency links with six different Ground Stations.

In the example where six single frequency communication links are established, if additional bandwidth is desired and dual-frequency communications are available, one or more, or pairs, of the single frequency communication links can be converted to dual-frequency links as needed.

The Air Station and involved Ground Stations can then communicate to set the necessary frequency bandwidths, the need for single or dual frequency transmissions, and to provide the desired communication bandwidth to the Air Station. In the event that the bandwidth available from the addition communication links is exceeded, the Air Station and Ground Station can request still additional communication links up to the point that all of the ARAAs in the Air Station are fully utilized.

It should be noted that the example of FIGS. 10A and 10B shows the plane 10000 in the same location. It will be appreciated that the establishment and adjustment of the various is communication links will be occurring as the plane travels across the geographical space and that the communication links at issue will actually be transitioning between ARAAs within the Air Station, between GRAAs within the initially involved Ground Stations and between multiple Ground Stations as the plane traverses geographical space.

As described above, in the various examples described above, the Ground Stations will cooperate with Air Stations in planes to provide high bandwidth communications with the Air Stations including a plurality of ARAAs and the Air Stations can then, in turn, use devices such as communication device 6500 to enable communication devices (e.g., laptops, smart phones) within the plane to utilize the available bandwidth. Alternate embodiments are envisioned, however, where the Ground Stations and Air Stations are simplified to enable the establishment of a cost-effective system.

The availability of a number of high bandwidth communication links provided by the system disclosed herein allows for efficient control of the data provided to/or received from each of the ARAAs and, in turn, each of the individual devices within the cabin of a plane.

Thus, for example, by having multiple Ground Stations available to service each of the airplanes in the space covered by the system, high-bandwidth links can be dynamically allocated to particular planes with high demand and low bandwidth communication links can be dynamically allocated to other planes to provide on-demand Internet service. In this manner bandwidth adjustments can be made on a plane-by-plane basis.

The system further permits efficient control of the multiple communication links established for a given plane. For example, if the wireless devices within the plane are transmitting and receiving data at roughly the same level, then it may be appropriate to distribute the bandwidth of the communications equally across the various communication links then in use. However, if it is determined that many of the devices are engaged in significant streaming activity (such that the upload of data to the ARAAs and then to the communicating devices) is dominant, then it may be optimal to devote one or more of the communication channels solely to the streaming uplink of data from a GRAA to an ARAA. Doing so, may permit more efficient compression and transmission of data as the dedicated links can be used solely (primarily) for one type of data is transmission. By using such an approach, the transmission of data from an ARAA to a GRAA (which would otherwise potentially interrupt the streaming transmission of data from a GRAA to an ARAA as it would require use of the link to transmit data from the ARAA to the GRAA) can be directed to an alternative communication link and the communication links used for streaming can continue to be used primarily (or exclusively) over a given period, for the transmission of data to one or more ARAAs in the Air Station.

The above is but one example of the alternative approaches enabled by the disclosed system. Others as may be apparent to those ordinarily skilled in the arts when presented with this disclosure are envisioned.

In terms of the network architecture, any of the known network medias and transports may be used in this application. Without limitation, this may include the Internet Protocol as is used throughout the Internet; packet relay technology; asynchronous transfer mode (ATM); frame relay; circuit switching; or any other technology that is practicable.

Selecting an upcoming GRAA while the airplane containing an ARAA is moving will need to be done rapidly. The airplane may select an upcoming GRAA through the use of signal strength and bandwidth availability, which may be signaled through a command/control signal from the GRAA. This may be sent to individual aircraft that identify themselves to the GRAA, or they may be broadcast for all receivers to make decisions based upon the information they contain.

A fairness algorithm may be implemented so that congested Ground Station may not be selected even though an aircraft is very close to it and the GRAA has the best signal strength. For example when a small aircraft with few devices on it needing Internet access is close to a Ground Station at the same time that a large aircraft with hundreds of devices on it is further away from the same GRAA, the GRAA may determine that its capabilities are best used by devoting itself to serving the larger aircraft. The GRAA may then signal to the smaller aircraft to find an alternative Ground Station, even if the alternative has poorer signal strength.

When an airplane is moving between one GRAA and another, it will start to lose the signal from the previous GRAA and will need to acquire a signal from a next GRAA. During this transition, it is desirable to not lose any signals transmitted to or from the stations. As noted, the airplane may be receiving signals from other (upcoming) GRAAs and may select one based is upon signal strength, congestion, and possibly other determinations. In one embodiment, if the airplane is actively transmitting signals to destinations on the Internet, it may duplicate these signals and send them to the active GRAA and any other Ground Station receiver capable of receiving them. This may be done before the airplane establishes a link to that GRAA. In this embodiment, the GRAA should receive those signals and send them to their intended destinations. In the Internet Protocol, it is known that duplication of packets may occur, and they may be properly handled by a receiver. While this may incur additional bandwidth usage in the backhaul network, it may be preferable to do this so that handoffs are not disruptive.

As will be appreciated from a review of this disclosure, the exemplary systems described herein can supply massive communication bandwidth to the sky with a limited number of allocated frequencies and minimal ground and airplane hardware. Thus, for example, if a Ground Station has twenty-five (25) GRAAs (and therefore 25 directional antenna) each Ground Station could communicate at any given time with up to twenty-five Air Stations (and thus 25 different airplanes on a first frequency and, if dual-frequency communications were enabled, to another twenty-five (25) Air Stations for a total of fifty (50) different airplanes that can be supported at any given time. As another example, a system including two hundred (200) Ground Stations (each with twenty-five GRAAs and thus 25 different antenna) could potentially communicate, using single-frequency communications, with up to five-thousand different airplanes in the sky supported by the system. With dual-frequency communications, the number of supported airplanes could be doubled (or the bandwidth to each of the five thousand planes could be doubled). With multi-frequency communications supporting three frequency communications, the number of supported planes (or the bandwidth to each plane) cold be tripled, and so forth as the number of frequencies supported by each GRAA at any given time increases.

HIGHLY SENSITIVE RADAR SYSTEM: In addition to supporting the high-bandwidth communication system previously described, the GRAAs described herein can be used to provide a flexible, adaptable, highly sensitive RADAR system suitable for detecting airborne objects having an extremely low RADAR profile, such as aircraft or drones employing stealth technology.

In accordance with the teachings of this disclosure, a plurality of GRAAs may be is configured to generated radio frequency signals that, utilizing the directional antenna within the GRAAs and the SDRs within the radio are configured such that each of the GRAAs within the plurality of GRAAs will transit a radio signal into a defined area of space, in such a manner that all of the transmitted radio signals will arrive at the same area of space at the same time, or at approximately the same time. Some or all of the GRAAs within the plurality of GRAAs that transmitted the described signals—potentially in combination with other GRAAs— can then scan for received signals that corollate to signals that would be associated with reflections of the transmitted signals from an object within the defined area of space. The detection of such signals can then provide an indication of the likely presence of an object within the defined area of space. The system can then repeat the described process (using actual or predicted information concerning the flight path of the object) to identify and track objects with extremely low RADAR profiles. Moreover, since such a RADAR system can involve the use of a large number of GRAAs, each having large number of directional antenna, the system can track fast moving objects since a "scanning" of various regions of the sky can be accomplished through the transmission of signals from various fixed antenna (as opposed to the mechanical movement of one or more transmitters/receivers). Still further, the frequency (or frequencies) of the various transmitted signals can be adjusted—or swept through a range—such that the transmitted signals can span a broad frequency range. Still further, the transmitted signals may adhere to a frequency pattern. A receiver receiving a reflected signal may then be able to correlate a transmitted pattern with a specific GRAA. If different GRAAs each use a specific pattern they may be able to transmit simultaneously, and receiving GRAAs would be able to correlate a pattern with a transmitter thus providing more specific details of the source of the original signal and the reflection to further pinpoint the presence and location of an object.

Note that the use of the GRAAs described herein within a RADAR system—as described—does not preclude the use of the same GRAAs within a system primarily intended for communication applications.

Note that the above described system, utilizing contemporaneously arriving radio signals, from a number of different, geographically-spaced locations, and potentially across a broad frequency range will—in essence—paint the defined area of space with radio signals arriving (at substantially the same time) from different locations, at different angles, having passed through is different atmospheric conditions, in such a manner that they can tend to overcome some (if not all) of the techniques used by stealth aircraft to reduce their profile.

Figure 11A:
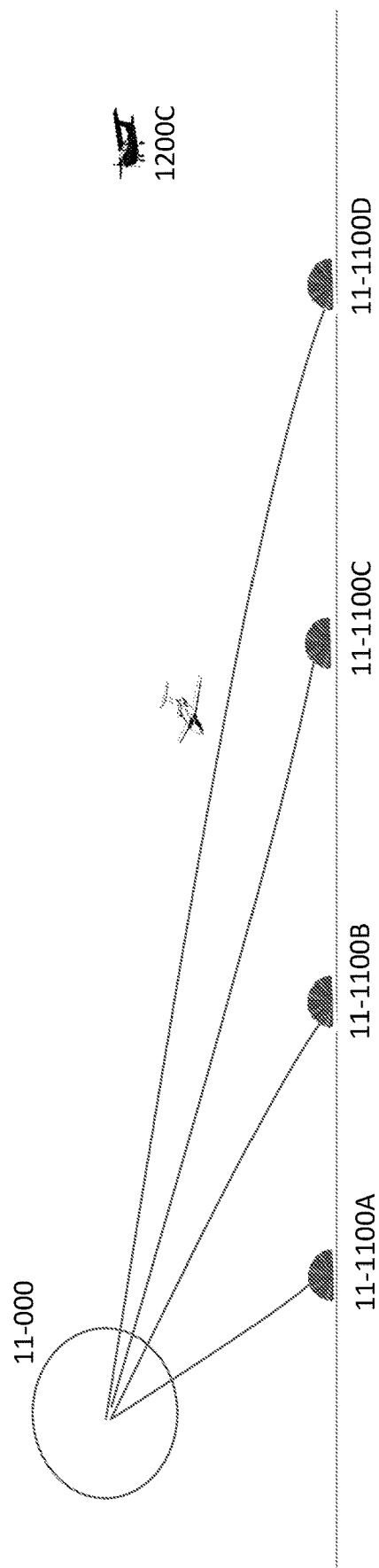
FIG. 11A illustrates certain aspects of a RADAR system utilizing certain teachings of this disclosure.

FIG. 11A illustrates certain aspects of a RADAR system utilizing certain teachings of this disclosure. Similar to FIG. 1, FIG. 11A illustrates a small-system, or a portion of a larger system, that includes four (4) GRAAs—11-1100A, 11-1100B, 11-1100C and 11-1100D. As reflected in FIG. 11A, the SRD's within each of these GRAAs may be configured—using the apparatus, methods and techniques described herein, to generate radio signals transmitted such that they will arrive in a specific defined space at substantially the same time. As an example, in the depiction of FIG. 11A, all four of the GRAAs are configured to transmit radio frequency signals into the specific defined area corresponding to the circled area 11-000.

In the illustrated example of FIG. 11A, there are no airborne objects within the specific defined area 11-000. Accordingly, in the example, little, if any, of the radio signals transmitted into specific defined area 11-000 will be reflected back in a manner wherein it can be detected by the various GRAAs within the illustrate plurality of GRAAs.

As described above, in one embodiment, the timing of the transmission of the radio frequency signal from the various GRAAs is configured such that the transmitted signals will all arrive in the specific defined area at (or substantially at) the same time. This will increase the power of the radio signals painting specific defined areas and, therefore, increase the likelihood for a reflected signal if an airborne object is passing through the area. The timing of such transmissions is something that can be accomplished by those of ordinary skill having the benefit of this disclosure using at least some or all of the following (perhaps using other data), which will be known: (a) the approximate air speed of the transmitted signal, (b) the location of the GRAA; and (c) the location of the specific defined area.

In the described example, the frequencies of the various transmitted signals can all be the same or can vary from GRAA to GRAA. In one preferred embodiment, all the transmitted frequencies directed to the same general area of the sky will have the same, or substantially the same frequencies. By using multiple signals, from different directions, all at the same (or substantially the same) frequency, the approach described herein ensures that the area of the sky to be scanned for objects is flooded with a transmitted signal where the cumulative power of the signal is greater than the power available from any given GRAA.

In the described example, in addition to transmitting the radio signals described above, each of the GRAAs can "listen" for reflected signals that could be associated with the transmitted signals. Since each GRAA would have access to information reflecting the time at which its transmitted signal would arrive within the specific defined area (and since each signal was transmitted to arrive at substantially the same time) each GRAA has the ability to correlate received signals with a signal indicative of a detected object within the defined area of space. Notably, however, the signal that may give rise to the reflection need not be exclusively a signal transmitted by the receiving GRAA, but could be a reflection of a signal from another GRAA entirely, or from other GRAAs and the detecting GRAA.

Figure 11B:
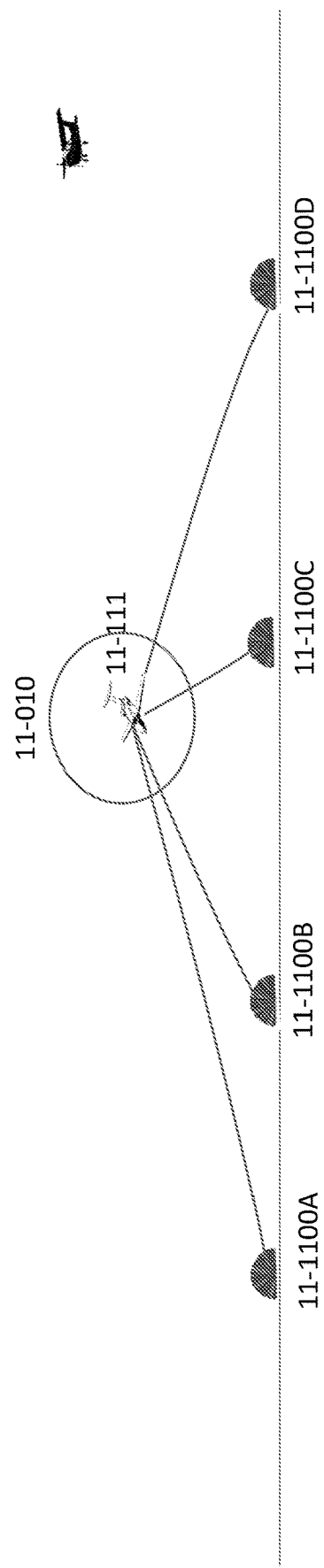
FIG. 11B shows a further example of how a RADAR system constructed in accordance is with the teachings of this disclosure can be used to detect an aircraft.

FIG. 11B shows a further example of how a RADAR system constructed in accordance with the teachings of this disclosure can be used to detect an aircraft. In this example, all of the illustrated GRAAs are configured to transmitted radio signals into the specific defined area 11-010. In his example, a plane 11-111 is within that area. As such, the plane will provide a surface from which at least some of the transmitted signals will be reflected. Each of the GRAAs that transmitted one of the radio signals into the specific defined area—as well as any other GRAAs within the overall system—can monitor its received signals for signals that would correlate to such a reflected signal. Data from all of the GRAAs in the overall system (for example, all of the GRAAs in the system of FIG. 9B) could then be processed (locally or at a central location) using a processor (or a group of processors) to determine the likelihood of an object within the specific defined area.

Figure 11C:
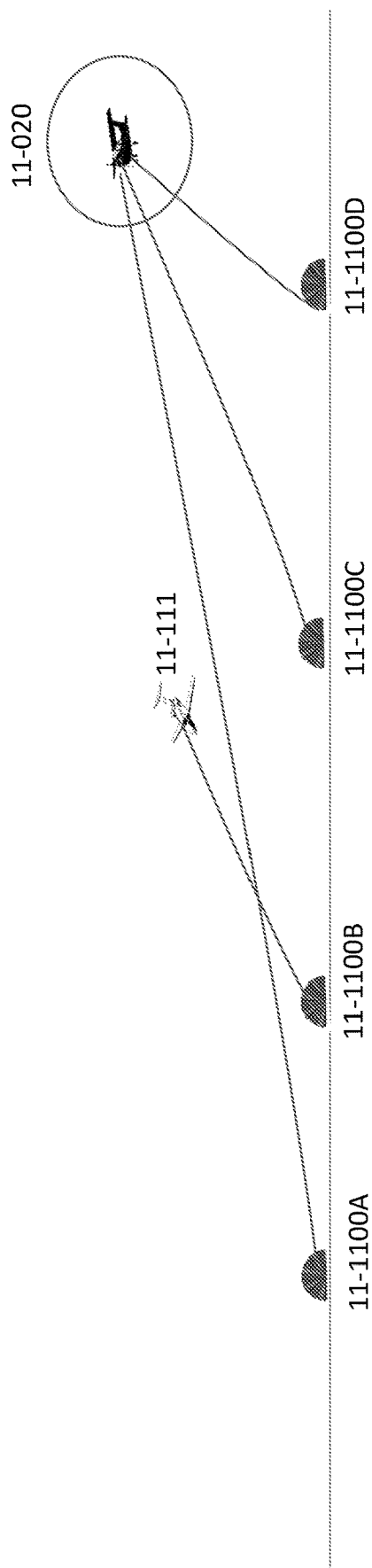
FIG. 11C shows yet a further example of how a RADAR system constructed in accordance with the teachings of this disclosure can be used to detect one aircraft and communicate with another.

FIG. 11C shows yet a further example of how a RADAR system constructed in accordance with the teachings of this disclosure can be used to detect an aircraft. In this example, GRAAs 11-1100A, 11-1100C and 11-1100D are used to transmit signals into a region of space containing aircraft 11-020 while GRAA 11-1100B is used to communicate with aircraft 11-111.

Further embodiments are envisioned wherein advanced processing techniques are used to implement the described RADAR system. For example, within a given area of space, over given periods of time, the average reflected signals may be relatively stable or within predicted is bounds. Embodiments of the described RADAR system are envisioned wherein the general level of reflected signals is detected (using the techniques described above and a first number of GRAAs) and a notice is generated if the level of reflected signal deviates from the expected level of reflected signals for that particular time. If such a notice is generated, the system could then focus signals into that particular area using the specific technique described above, and a second—larger— number of GRAAs to better assess the likelihood of an unexpected airborne object within the defined area.

Note that in the described examples above, while the transmitted signals will all arrive at the specific defined are at (or substantially at) the same time, the reflected signals will arrive at the various GRAAs within the system at different times. However, the GRAAs can be configures to process the received signals, or transmit them to one or more separate processing units, to process the signals to identify objects in the scanned space.

While not illustrated in FIGS. 11A-11C, it is possible to combine the RADAR approach described above that utilizes multiple GRAAs with a similar approach using one or more ARAAs where one or more ARAAs would—in conjunction with one or more GRAAs— direct a signal into a particular area of space in such a manner that the signal(s) from the ARAA(s) have the same (or substantially the same) frequency as the signals from the GRAAs and all transmitted signals arrive at the same region of space at the same (or substantially the same) time.

Figure 12:
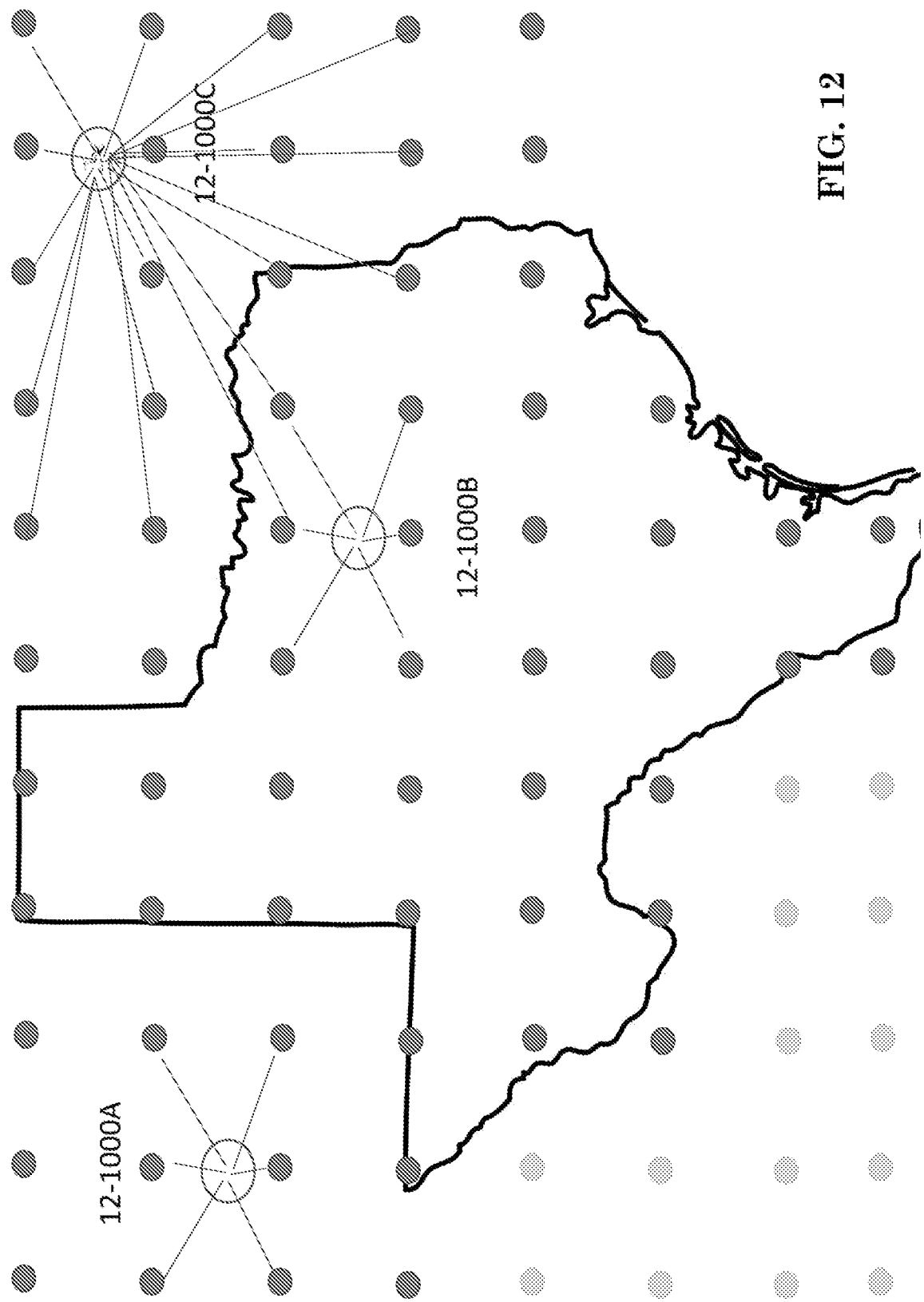
FIG. 12 illustrates an embodiment where multiple GRAAs (and potentially ARAAs) are configured and operated to provide RADAR coverage over different areas of space.

FIG. 12 illustrates an embodiment where multiple GRAAs (and potentially ARAAs) are configured and operated to provide RADAR coverage over different areas of space. In the above example, first collection of GRAAs (and potentially one or more ARAAs) directs signals into a first region of space 12-1000A, a second collection of GRAAs (and potentially one or more ARAAs) direct signals into a second region of space 12-1000B and a third collection of GRAAs (and potentially one or more ARAAs) direct signals into a third region of space 12-1000C, where the number of GRAAs (and potentially ARAAs) can vary between the different collections. By utilizing a number of such collections a RADAR system can be established that covers a substantial area of space.

The Figures described above, and the written description of specific structures and functions below are not presented to limit the scope of what I have invented or the scope of the is appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Aspects of the inventions disclosed herein may be embodied as an apparatus, system, method, or computer program product. Accordingly, specific embodiments may take the form of an entirely hardware embodiment, an entirely software embodiment or an embodiment combining software and hardware aspects, such as a "circuit," "module" or "system." Furthermore, embodiments of the present inventions may take the form of a computer program product embodied in one or more computer readable storage media having computer readable program code.

Reference throughout this disclosure to "one embodiment," "an embodiment," or similar language means that a feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply is that any or all the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Aspects of the present disclosure are described with reference to schematic flowchart diagrams and/or schematic block diagrams of methods, apparatuses, systems, and computer program products according to embodiments of the disclosure. It will be understood by those of skill in the art that each block of the schematic flowchart diagrams and/or schematic block diagrams, and combinations of blocks in the schematic flowchart diagrams and/or schematic block diagrams, may be implemented by computer program instructions. Such computer program instructions may be provided to a processor of a general purpose computer, special purpose computer, or other programmable data processing apparatus to create a machine or device, such that the instructions, which execute via the processor of the computer or other programmable data processing apparatus, structurally configured to implement the functions/acts specified in the schematic flowchart diagrams and/or schematic block diagrams block or blocks. These computer program instructions also may be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus is provide processes for implementing the functions/acts specified in the flowchart and/or block diagram block or blocks.

The schematic flowchart diagrams and/or schematic block diagrams in the Figures illustrate the architecture, functionality, and/or operation of possible apparatuses, systems, methods, and computer program products according to various embodiments of the present inventions. In this regard, each block in the schematic flowchart diagrams and/or schematic block diagrams may represent a module, segment, or portion of code, which comprises one or more executable instructions for implementing the specified logical function(s).

It also should be noted that, in some possible embodiments, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they do not limit the scope of the corresponding embodiments. Indeed, some arrows or other connectors may be used to indicate only the logical flow of the depicted embodiment. For example, but not limitation, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and computer instructions.

The description of elements in each Figure may refer to elements of proceeding Figures Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially is concurrently or the operations may be executed in the reverse order, depending upon the functionality/acts/structure involved.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A RADAR system comprising:
  a plurality of ground stations, each comprising a plurality of ground-based directional antennae, each ground-based directional antenna having a beam width associated with a particular area of space above the ground station;
  each ground-based directional antenna comprising at least one software defined radio coupled to the directional antenna so that the ground-based directional antenna transmits one or more radio frequency signals generated by the software defined radio at one or more frequencies and provides to the software defined radio signals received by the ground-based directional antenna at one or more frequencies;
  wherein, each of a plurality of the ground stations may transmit a radio frequency signal to a defined area of space so that the transmitted radio signals arrive in the defined area of space at approximately the same time; and wherein, each of the plurality of ground stations detect radio signals reflected by an object within the defined area of space; and
  wherein the RADAR system further comprises a processor for processing reflected signals received by one or more of the plurality of ground stations to identify the presence of objects within the defined space.

2. The system of claim 1 wherein each of the plurality of ground stations that transmits a radio frequency signal into the defined space also transmits a signal having the same or substantially the same frequency as the signals transmitted by the other ground stations within the plurality of ground stations.

3. The system of claim 2 wherein the software defined radios in the ground stations generate radio frequency signals within the range of 700 MHz. to 2.5 GHz.

4. The system of claim 1, wherein the transmitted radio frequencies are swept through a range of frequencies.

5. The system of claim 1, wherein the transmitted radio frequencies adhere to a frequency pattern.

6. The system of claim 1, wherein each ground station comprises a receiver for receiving reflected signals.

7. The system of claim 1, wherein the plurality of ground stations are geographically spaced one from the other, and the transmitted signals are swept across a broad frequency range.

8. The system of claim 1, wherein timing of transmission of the signals causes the signals to arrive in the defined space at substantially the same time.

9. The system of claim 1, wherein the frequency of the transmitted signals varies by ground station.

10. The system of claim 1, wherein each of the plurality of ground stations correlates received signals with an object detected within the defined space.

11. The system of claim 10, wherein the detected object is an airplane or a drone.

12. The system of claim 1, wherein the processor determines an average reflected signal for a defined space and identifies reflected signals above the average reflected signal for a defined space.

13. The system of claim 1, comprising one or more airborne antenna arrays.

14. The system of claim 1, wherein the plurality of antennae comprises Yagi-type antenna or Yagi-parabolic hybrid antenna.

* * * * *